(12) United States Patent
Gotoh et al.

(10) Patent No.: US 8,355,177 B2
(45) Date of Patent: Jan. 15, 2013

(54) IMAGE PROCESSING APPARATUS, IMAGE FORMING APPARATUS, IMAGE PROCESSING METHOD, AND COMPUTER-READABLE STORAGE MEDIUM CONTAINING IMAGE PROCESSING PROGRAM

(75) Inventors: Makio Gotoh, Osaka (JP); Takeshi Ohwaku, Osaka (JP); Tatsuya Tanaka, Osaka (JP); Mihoko Tanimura, Osaka (JP); Motohiro Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 727 days.

(21) Appl. No.: 12/547,965

(22) Filed: Aug. 26, 2009

(65) Prior Publication Data

US 2010/0053690 A1    Mar. 4, 2010

(30) Foreign Application Priority Data

Aug. 27, 2008  (JP) ................. 2008-218836

(51) Int. Cl.
*G06T 5/00* (2006.01)
*G03F 3/10* (2006.01)
*H04N 1/46* (2006.01)

(52) U.S. Cl. .............. 358/3.27; 358/527; 358/537

(58) Field of Classification Search .......... 358/3.27, 358/1.9, 519, 537, 527; 382/252, 237, 298
See application file for complete search history.

(56) References Cited

U.S. PATENT DOCUMENTS

| | | | |
|---|---|---|---|
| 6,373,990 B1 * | 4/2002 | Ushida et al. .......... | 382/252 |
| 6,728,425 B1 | 4/2004 | Tokuyama et al. | |
| 2004/0179234 A1 | 9/2004 | Yoshitani | |

FOREIGN PATENT DOCUMENTS

| | | |
|---|---|---|
| JP | 3-259193 A | 11/1991 |
| JP | 6-276191 A | 10/1993 |
| JP | 6-296235 A | 10/1994 |
| JP | 9-44128 A | 2/1997 |
| JP | 9-135316 A | 5/1997 |
| JP | 9-179964 A | 7/1997 |
| JP | 2000-341505 A | 12/2000 |
| JP | 2004-106196 A | 4/2004 |
| JP | 2004-282382 A | 10/2004 |

(Continued)

OTHER PUBLICATIONS

Office Action dated Jul. 8, 2011 for Co-Pending U.S. Appl. No. 12/583,807.

(Continued)

*Primary Examiner* — Charlotte M Baker
(74) *Attorney, Agent, or Firm* — Birch, Stewart, Kolasch & Birch, LLP

(57) ABSTRACT

The image processing apparatus of the present invention includes: a bit number correction process section for converting tones of binary image data into a maximum tone and a minimum tone of multilevel image data; a spatial filter section for performing a smoothing process on image data resulting from the bit number conversion; and an enlarging/reducing section for performing an interpolation process on the image data subjected to the smoothing process so that smoothness of tones of the image data is maintained, the image data subjected to the interpolation process being supplied to the image display device.

This allows an image display device for displaying multilevel image data to display a preview image of binary image data without deteriorating the quality of image data.

10 Claims, 14 Drawing Sheets

FOREIGN PATENT DOCUMENTS

| | | | |
|---|---|---|---|
| JP | 2005-175917 A | 6/2005 |
| JP | 2007-13534 A | 1/2007 |
| JP | 2007-28336 A | 2/2007 |
| JP | 2007-48235 A | 2/2007 |
| JP | 2008-187230 A | 8/2008 |

OTHER PUBLICATIONS

Office Action dated Nov. 21, 2011 for related U.S. Appl. No. 12/547,624.

Office Action for co-pending U.S. Appl. No. 12/547,989, mailed Mar. 2, 2012.

Advisory Action for related U.S. Appl. No. 12/547,624 issued on Jul. 6, 2012.

Office Action dated Jun. 6, 2012 for Co-Pending U.S. Appl. No. 12/583,803.

Office Action for related U.S. Appl. No. 12/547,624 mailed Apr. 18, 2012.

Notice of Panel Decision issued in co-pending U.S. Appl. No. 12/547,624 on Aug. 21, 2012.

Office Action dated Sep. 6, 2012 for Co-Pending U.S. Appl. No. 12/547,989.

* cited by examiner

IMAGE PROCESSING APPARATUS, IMAGE FORMING APPARATUS, IMAGE PROCESSING METHOD, AND COMPUTER-READABLE STORAGE MEDIUM CONTAINING IMAGE PROCESSING PROGRAM

This Nonprovisional application claims priority under 35 U.S.C. §119(a) on Patent Application No. 2008-218836 filed in Japan on Aug. 27, 2008, the entire contents of which are hereby incorporated by reference.

TECHNICAL FIELD

The present invention relates to an image processing apparatus, an image forming apparatus, an image processing method, and a computer-readable storage medium containing an image processing program, each of which serves to display a thumbnail or preview of input image data.

BACKGROUND ART

Some image forming apparatuses such as copying machines and multifunction printers display, in accordance with image data processed according to the type of document and the setting conditions (e.g., print density, enlarging/reducing ratio, single-side printing/double-side printing, margin size, a preview of a single image to be printed or a combination of images to be printed.

Further, Patent Literature 1 for example discloses a facsimile device that receives encoded image data and decodes the image data with respect to each time a certain amount of data is received, and zooms up/down the image to have the size of a preview image, and causes the image to be displayed by a display section. This facsimile device allows displaying a preview image of received data while receiving the data.

Citation List

Patent Literature 1
Japanese Patent Application Publication, Tokukai, No. 2004-282382 A (Publication Date: Oct. 7, 2004)
Patent Literature 2
Japanese Patent Application Publication, Tokukaihei, No. 9-135316 A (Publication Date: May 20, 1997)

SUMMARY OF INVENTION

Technical Problem

However, data received by a facsimile device is binary and low resolution (e.g. 200 dpi), and a downsampling process is carried out in order to carry out a preview display. Consequently, image information is deleted, and an image with lower image quality is displayed in a preview display.

The present invention was made in view of the foregoing problems. An object of the present invention is to provide an image processing apparatus etc. that allows an image display device capable of displaying multilevel image data to carry out a preview display of binary image data without dropping image quality of image data.

Solution to Problem
In order to solve the foregoing problems, an image processing apparatus of the present invention is an image processing apparatus, including an image processing section for processing multilevel image data, for generating image data that allows a preview image of binary image data to be displayed by an image displaying device for displaying an image of multilevel image data, the image processing apparatus comprising: a tone conversion process section for converting tones of binary image data into a maximum tone and a minimum tone of multilevel image data processed by the image processing section; a smoothing process section for performing a smoothing process on image data resulting from the conversion by the tone conversion process section; and an interpolation process section for performing an interpolation process on the image data subjected to the smoothing process by the smoothing process section, so that smoothness of tones of the image data is maintained, the image data subjected to the interpolation process by the interpolation process section being supplied to the image display device.

Advantageous Effects of Invention

With the arrangement, when the image display device for displaying multilevel image data displays a preview image of binary image data, tones of the binary image data are converted into tones of multilevel image data and the multilevel image data is subjected to the smoothing process, generating an intermediate value. By downsampling image data with the intermediate value by the interpolation process and displaying a preview image of the image data, deletion of information is prevented. This prevents deterioration in image quality. Consequently, lines and texts are maintained, making the image more legible. Accordingly, with the arrangement, it is possible to reduce deletion of image information when the image display device for displaying multilevel image data displays a preview image of binary image data, thereby preventing deterioration in image quality. This provides a preview display with high visibility.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a flow chart showing steps of a process that is performed by the image forming apparatus in the copier mode and the full-color mode.

FIG. 7 is a block diagram showing the image forming apparatus of the present embodiment and showing the flow of image data in a transmission process in a facsimile transmission mode.

FIG. 8 is a block diagram showing the image forming apparatus of the present embodiment and showing the flow of image data in a preview display process in the facsimile transmission mode.

FIG. 9 is a block diagram showing the image forming apparatus of the present embodiment and showing the flow of image data in a printing process in a facsimile reception mode.

FIG. 10 is a block diagram showing the image forming apparatus of the present embodiment and showing the flow of image data in a preview display process in the facsimile reception mode.

FIG. 11 is a block diagram showing a modification of the image forming apparatus of the present embodiment.

FIG. 12 is a block diagram showing an image forming apparatus of another embodiment and showing a flow of image data when performing a preview display process in a facsimile reception mode.

FIG. 13 is a block diagram showing in detail a spatial filter section of the image forming apparatus of another embodiment.

FIG. 14 is a block diagram showing in detail a spatial filter section of the image forming apparatus of another embodiment.

FIG. 15 is a block diagram showing in detail an enlarging/reducing section of the image forming apparatus of another embodiment.

DESCRIPTION OF EMBODIMENTS

[Embodiment 1]

Figure 1:
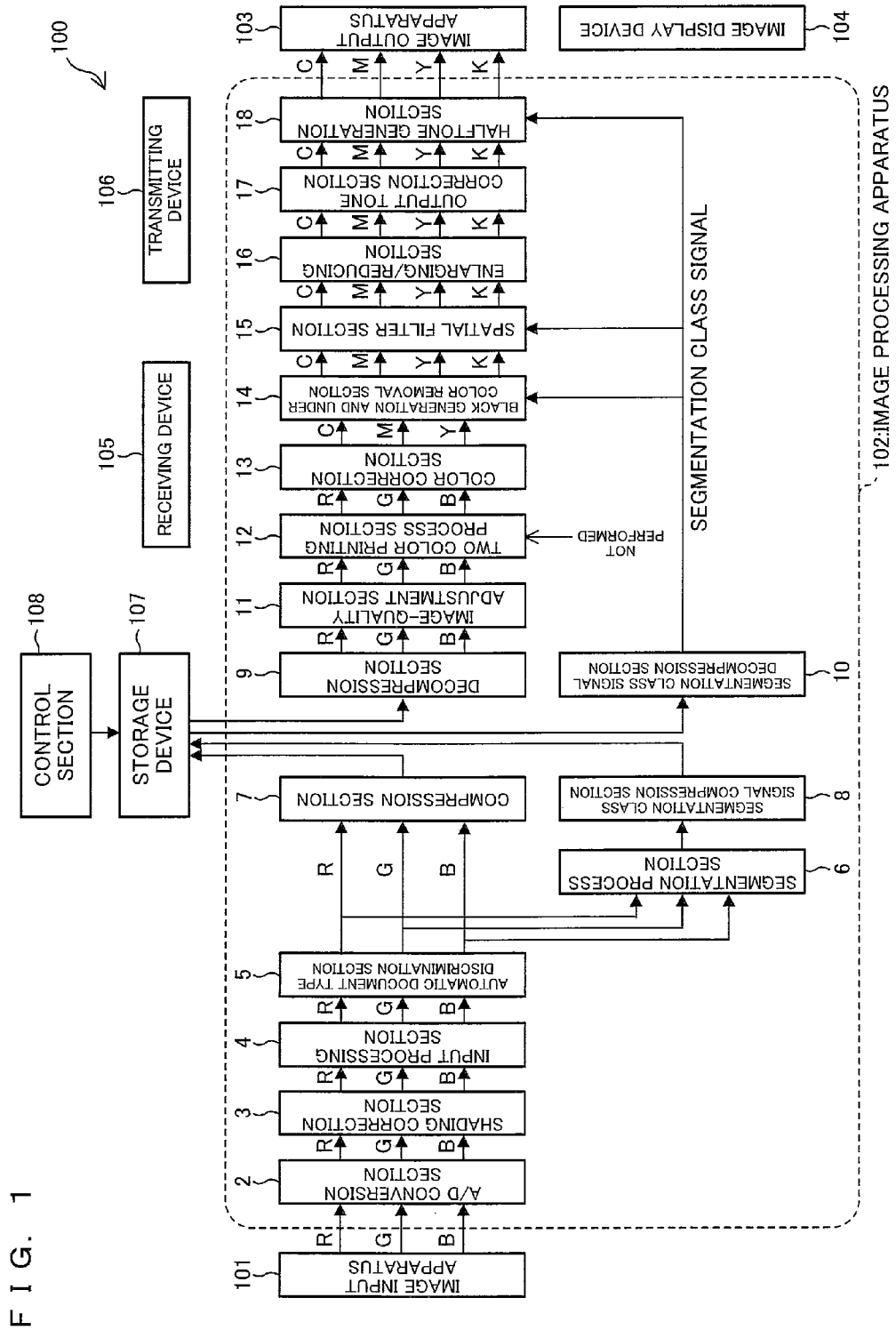
FIG. 1
FIG. 1 is a block diagram showing an image forming apparatus of the present embodiment and showing the flow of image data in a printing process in a copier mode and a full-color mode.

One embodiment of an image forming apparatus of the present invention is described below with reference to the attached drawings. FIG. 1 is a block diagram schematically showing an arrangement of an image forming apparatus 100 of the present embodiment.

The image forming apparatus 100 of the present embodiment is a digital color multifunction printer that executes a mode selected from among a copier mode, a print mode, a facsimile transmission mode, a facsimile reception mode, and an image transmission mode.

The copier mode (copy mode) means a mode in which to read image data (generates image data by scanning a document) and print an image of the image data onto a sheet of paper. The print mode means a mode in which to print, onto a sheet of paper, an image of image data sent from a terminal apparatus connected to the image forming apparatus 100. The facsimile transmission mode means: a normal facsimile mode in which to transmit, to an external apparatus via a telephone line, image data obtained by scanning a document; and an Internet facsimile mode in which to transmit an e-mail with the image data attached thereto. The facsimile reception mode means a mode in which to receive image data from an external apparatus by facsimile and print an image of the received image data onto a sheet of paper. The image transmission mode means: (1) a mode (scan to e-mail mode) in which to attach, to an e-mail, image data generated by scanning a document, and transmit the e-mail to a specified address; (2) a mode (scan to ftp mode) in which to transmit, to a folder specified by a user, image data generated by scanning a document; and (3) a mode (scan to usb mode) in which to transmit, to a USB memory mounted in the image forming apparatus 100, image data generated by scanning a document. It should be noted that the facsimile transmission mode and the image transmission mode are each classified as above according to the type of image processing operation.

Further, in the copier mode or print mode, the user can select a black-and-white mode in which to output a black-and-white image, a full-color mode in which to output a full-color image, a single-color mode in which to output a monochrome image having only one color desired by the user, or a two-color mode in which to output a two-color image having black and one color desired by the user.

For example, in cases where the user selects the single-color mode in the copier mode or print mode, the monochromatic image is printed. Further, in cases where the user selects the two-color mode in the copier mode or print mode, the two-color image is printed. It should be noted that in the single-color mode or two-color mode, the user selects his/her desired color from among R (red), G (green), B (blue), C (cyan), M (magenta), and Y (yellow).

Further, according to the present invention it is possible to set an automatic discrimination mode in the copier mode. In the automatic discrimination mode, the image forming apparatus 100 performs auto color selection (ACS) for judging whether an object to be copied is a color document or a black-and-white document. In the case of a color document, the image forming apparatus 100 performs an output process in the full-color mode. In the case of a black-and-white document, the image forming apparatus 100 performs an output process in the black-and-white mode.

As shown in FIG. 1, the image forming apparatus 100 includes an image input apparatus 101, an image processing apparatus 102, an image output apparatus 103, an image display device 104, a receiving device 105, a transmitting device 106, a storage device 107, and a control section 108.

The image input apparatus 101 is image scanning means for generating image data by scanning a document in the copier mode, the facsimile transmission mode, and the image transmission mode. More specifically, the image input apparatus 101, which includes a scanner section having a CCD (charge-coupled device), converts light reflected by a document into an electrical signal separated into colors RGB (i.e., into an analog image signal) and sends the electrical signal to the image processing apparatus 102.

It should be noted that the image input apparatus 101 scans a document image in full color in any one of the full-color mode, the single-color mode, and the two-color mode. Further, the image input apparatus 101 scans a document image in full color even in cases where the image processing apparatus 102 performs the aforementioned auto color selection.

The image processing apparatus 102 is an integrated circuit, constituted by an ASIC (application specific integrated circuit), which performs image processing on image data (image signals). As shown in FIG. 1, the image processing apparatus 102 includes the following blocks: an A/D (analog/digital) conversion section 2, a shading correction section 3, an input processing section 4, an automatic document type discrimination section 5, a segmentation process section 6, a compression (encode) section 7, a segmentation class signal compression (encode) section 8, a decompression (decode) section 9, a segmentation class signal decompression (decode) section 10, an image-quality adjustment section 11, a two-color printing process section 12, a color correction section 13, a black generation and under color removal section 14, a spatial filter section 15, an enlarging/reducing (zoom process) section 16, an output tone correction section 17, and a halftone generation section 18. Processes that are performed by the blocks of the image processing apparatus 102 will be detailed later.

In the copier mode, facsimile transmission mode, or image transmission mode, the image processing apparatus 102 performs image processing on image data sent from the image input apparatus 101. In the print mode, the image processing apparatus 102 performs image processing on image data transmitted from a terminal apparatus. In the facsimile reception mode, the image processing apparatus 102 performs image processing on image data received from an external apparatus. Then, in the copier mode, print mode, or facsimile reception mode, the image processing apparatus 102 transmits, to the image output apparatus 103, the image data subjected to image processing. In the facsimile transmission mode, the image processing apparatus 102 transmits, to the transmitting device 106, the image data subjected to image processing. Further, in the scan to e-mail mode, which is an image transmission mode, the image processing apparatus 102 transmits, to a mail processing section (not shown), the image data subjected to image processing. In the scan to ftp mode, which is another image transmission mode, the image processing apparatus 102 transmits, to a predetermined folder, the image data subjected to image processing. In the scan to usb mode, which is the other image transmission mode, the image processing apparatus 102 transmits, to a predetermined USB memory, the image data subjected to image processing.

The image output apparatus (printer) 103 forms, onto a recording medium (e.g., a sheet of paper), an image of image data sent from the image processing apparatus 102. An example is an electrophotographic or ink-jet color printer. The term "printing" in the present embodiment means printing in the print mode, printing in the copier mode, or printing in the facsimile reception mode.

The image display device 104 is a liquid crystal display provided in an operation panel (not shown) of the image forming apparatus 100, and is display means capable of displaying a color image. Further, the image display device 104, covered with a touch panel, functions as an input interface of the image forming apparatus 100. That is, the image display device 104 displays a GUI for inputting various commands to the image forming apparatus 100 and an operation guide.

Further, before execution of printing in the copier mode or facsimile reception mode, the image forming apparatus 100 of the present embodiment can display, on the image display device 104, a preview of an image to be printed. Furthermore, before execution of transmission in the facsimile transmission mode or image transmission mode, the image forming apparatus 100 of the present embodiment can display, on the image display device 104, a preview of an image to be transmitted.

Further, in the copier mode or image transmission mode and the full-color mode, the image display device 104 displays a preview of a full-color image. In the copier mode or image transmission mode and the single-color mode, the image display device 104 displays a preview of a monochrome image. In the copier mode or image transmission mode and the two-color mode, the image display device 104 displays a preview of a two-color image.

The image display device 104 is not limited to the liquid crystal display, and may be display means other than the liquid crystal display (e.g., an organic EL display or a plasma display).

The receiving device 105 is a device, connected to a telephone line or the Internet, which receives image data from an external apparatus by facsimile communication. Further, the transmitting device 106 is a device, connected to a telephone line or the Internet, which transmits, to an external apparatus by facsimile communication, image data inputted to the image input apparatus 101.

The storage device 107 is a hard disk in which image data to be processed in the image processing apparatus 102 is temporarily stored.

The control section 108 is a computer including a processor such as a CPU (central processing unit) or a DSP (digital signal processor), and comprehensively controls various types of hardware provided in the image forming apparatus 100. Further, the control section 108 functions to control data transfer between pieces of hardware provided in the image forming apparatus 100.

The following details the processes that are executed by the blocks of the image processing apparatus 102 in the copier mode, the facsimile transmission mode, the facsimile reception mode, and the image transmission mode, respectively. It should be noted that the image processing apparatus 102 of the present embodiment has a block that operates while a mode a is being used but does not operate while a mode b different from the mode a is being used (the mode a and the mode b each being any one of the copier mode, the facsimile transmission mode, the facsimile reception mode, and the image transmission mode). Further, the image processing apparatus 102 has a block that varies in processing according to the mode being used. Furthermore, the image processing apparatus 102 has: a block that, even in the same mode, operates in processing of image data to be printed (transmitted) but does not operate in processing of image data to be previewed; and a block that, even in the same mode, varies between processing of image data to be printed (transmitted) and processing of image data to be previewed. In the following, therefore, the processes that are executed by the blocks of the image processing apparatus 102 are described according to the type of mode, and those processes which are executed in a printing process (or in a transmission process) and those processes which are executed at the time of a preview display are described separately.

(1) Copier Mode (1-1) Printing Process (Image Print Job)

In the following, the image processing apparatus 102 is described with reference to FIG. 1, which shows the flow of image data in the image processing apparatus 102 performing a printing process in the copier mode and the full-color mode.

The A/D (analog/digital) conversion section 2 is a block that receives color image signals (RGB analog signals) from the image input apparatus 101 and converts the color image signals into digital image data (RGB digital signals). The shading correction section 3 is a block that receives image data form the A/D conversion section 2 and subjects the image data to a process of removing various distortions generated in illuminating, image-focusing, and image-sensing systems of the image input apparatus 101. The input processing section 4 is a block that receives RGB image data from the shading correction section 3 and subjects each of the RGB image data to a tone conversion process such as a gamma correction process.

In accordance with RGB image data (RGB density signals) subjected to processing such as gamma correction in the input processing section 4, the automatic document type discrimination section 5 discriminates among types of documents scanned by the image input apparatus 101. It should be noted here that the types of documents among which the automatic document type discrimination section 5 discriminates are a text document, a printed-picture document, a text/printed-picture document containing a text and a printed picture together, and the like. Further, in accordance with the image data, the automatic document type discrimination section 5 can perform auto color selection (ACS) for judging whether a scanned document is a color document or a black-and-white document and a process for judging whether or not a scanned document is a blank document (a solid-color document). It should be noted that the automatic document type discrimination section 5 sends the RGB image data to the segmentation process section 6 and the compression section 7.

In accordance with the RGB image data sent from the automatic document type discrimination section 5, the segmentation process section 6 performs a process of judging, for each pixel of the input image, what image area the pixel is classified into and generating a segmentation class signal indicating a result of the judgment. It should be noted here that the types of image areas among which the segmentation process section 6 discriminates are a black text area, a color text area, a halftone dot area, and the like. The segmentation process may take the form of a process of judging, for each block of pixels, what image area the block is classified into, instead of taking the form of a process of judging, for each pixel, what image area the pixel is classified into.

The compression section 7 is a block that performs a process of encoding image data (RGB signals) sent from the automatic document type discrimination section 5. The encoding is performed, for example, based on JPEG (Joint Photographic Experts Group).

The segmentation class signal compression section 8 is a block that performs a compression (encode) process on a segmentation class signal generated for each pixel. The compression process in the segmentation class signal compression section 8 is performed, for example, based on MMR (Modified Modified Reed) or MR (Modified Reed), which is a lossless compression technology.

The control section 108 receives encoded codes (encoded image data) from the compression section 7 and segmentation class signal codes (encoded segmentation class signals) from the segmentation class signal compression section 8, stores them temporarily in the storage device 107, and manages them as filing data. Then, in response to an instruction for a copy output operation, the control section 108 reads out, from the storage device 107, an encoded code and a segmentation class signal code corresponding to the encoded code, and sends them to the decompression section 9 and the segmentation class signal decompression section 10, respectively.

The control section 108 writes the storage address or data name of the encoded code and the storage address of the segmentation class signal code in a management table in association with each other. That is, the control section 108 controls reading or writing of encoded codes and segmentation class signal codes with reference to the management table.

The decompression section 9 decompresses the encoded code into RGB image data by performing a decompression (decode) process on the encoded code. Further, the segmentation class signal decompression section 10 performs a decompression process on the segmentation class signal code. The resulting segmentation class signal is sent to the black generation and under color removal section 14, the spatial filter section 15, and the halftone generation section 18. Then, the black generation and under color removal section 14, the spatial filter section 15, and the halftone generation section 18 select image processing according to the type of image area.

The image-quality adjustment section 11 receives the RGB image data from the decompression section 9, and performs background removal correction on the RGB image data by detecting a background in the RGB image data. Furthermore, the image-quality adjustment section 11 adjusts RGB balance (color adjustment of red, green, or blue), brightness, and intensity (saturation) in accordance with configuration information inputted by the user from the operation panel (not shown).

Furthermore, in the single-color mode, the image-quality adjustment section 11 converts the RGB image data into CMY image data complementary to the RGB image data. It should be noted here that the conversion of the RGB data into the CMY image data in the single-color mode is executed by using Eq. (1) below, where the coefficients r1 to r3 are defined based on [Table 1]. For example, in cases where the user selects cyan as his/her desired color in the single-color mode, the values of r1 to r3 in the column "Cyan" are referred to, with the result that r1=1, r2=0, and r3=0 are selected.

$$\begin{pmatrix} C \\ M \\ Y \end{pmatrix} = \begin{pmatrix} r1 \cdot a1 & r1 \cdot a2 & r1 \cdot a3 \\ r2 \cdot a1 & r2 \cdot a2 & r2 \cdot a3 \\ r3 \cdot a1 & r3 \cdot a2 & r3 \cdot a3 \end{pmatrix} \times \begin{pmatrix} R \\ G \\ B \end{pmatrix} + \begin{pmatrix} r1 \cdot c \\ r2 \cdot c \\ r3 \cdot c \end{pmatrix} \quad \text{Eq. (1)}$$

$a1 = -0.23046875$ $a2 = -0.79296875$ $a3 = 0.0234375$ $c = 255$

TABLE 1

| Adjustment Plane | Output Color (Single Color) | | | | | |
|---|---|---|---|---|---|---|
| | Red | Green | Blue | Cyan | Magenta | Yellow |
| r1 | 0 | 1 | 1 | 1 | 0 | 0 |
| r2 | 1 | 0 | 1 | 0 | 1 | 0 |
| r3 | 1 | 1 | 0 | 0 | 0 | 1 |

Figure 2:
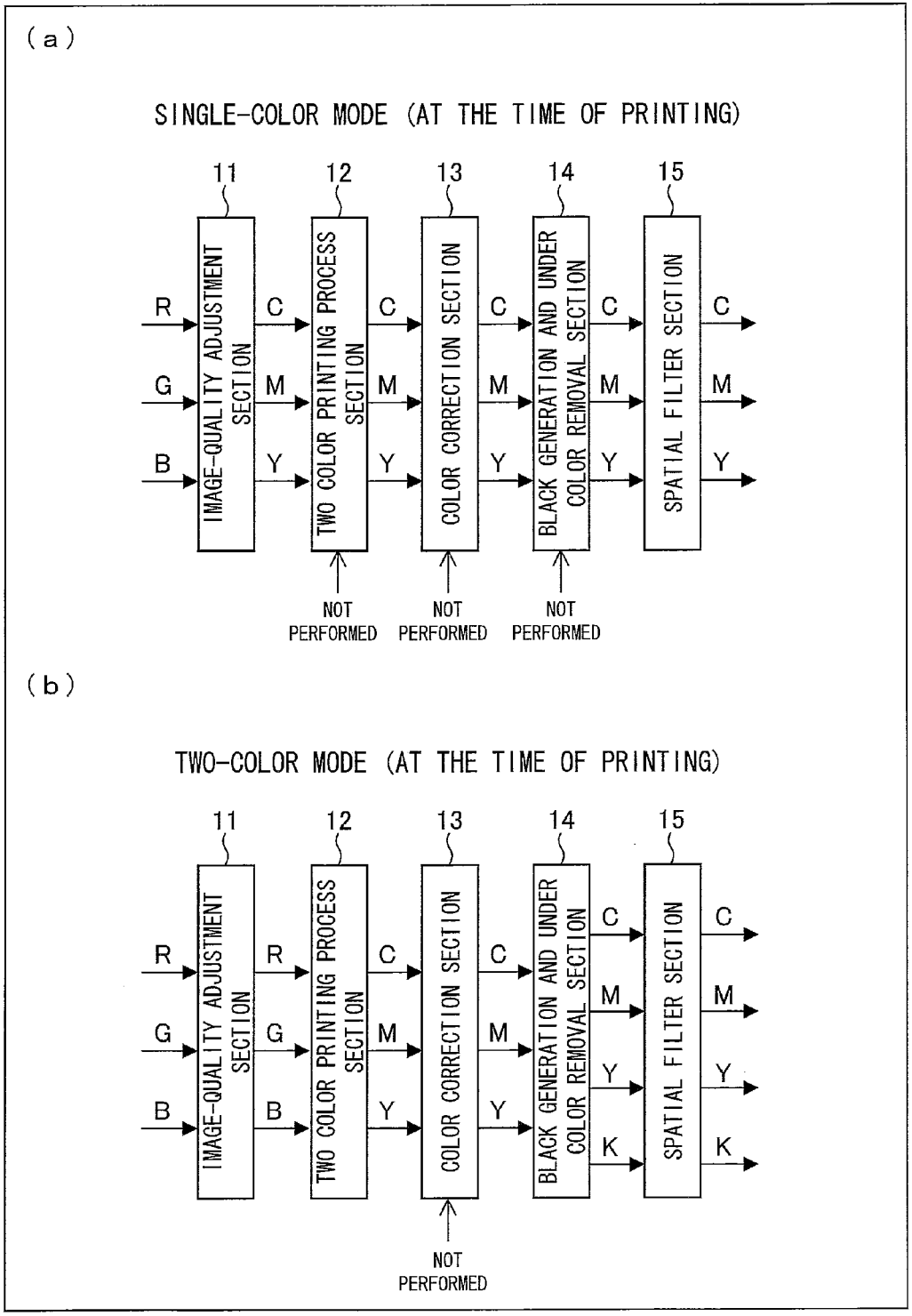
FIG. 2
FIG. 2 shows block diagrams showing a part inside of an image processing apparatus (a) performing a printing process in the copier mode and a single-color mode and (b) performing a printing process in the copier mode and a two-color mode.

That is, whereas the output from the image-quality adjustment section 11 in the full-color mode is RGB image data as shown in FIG. 1, the output from the image-quality adjustment section 11 in the single-color mode is CMY image data as shown in (a) of FIG. 2. It should be noted that the output from the image-quality adjustment section 11 in the two-color mode is RGB image data as shown in (b) of FIG. 2. (a) of FIG. 2 shows some of the blocks of the image processing apparatus 102 performing a printing process in the copier mode and the single-color mode, and (b) of FIG. 2 shows some of the blocks of the image processing apparatus 102 performing a printing process in the copier mode and the two-color mode.

Further, the adjustment of intensity by the image-quality adjustment section 11 can be realized by using the matrix of Eq. (1) after varying the values of r1 to r3 and a1 to a3 of the matrix. This makes it possible to use the same matrix and the same image processing circuit for the adjustment of intensity and the conversion of image data (from RGB into CMY) in the single-color mode. Therefore, in the present embodiment, the adjustment of intensity and the conversion of image data in the single-color mode are performed by the same processing section (image-quality adjustment section 11).

The two-color printing process section 12 is a block that, in the two color mode, receives RGB image data from the image-quality adjustment section 11 and converts the RGB image into CMY image data as shown in (b) of FIG. 2. The conversion of the RGB image data into the CMY image data in the two-color mode can be realized, for example, by a technique of [Embodiment 1] or [Embodiment 2] described in Japanese Patent Application Publication, Tokukai, No. 2007-28336 A.

Further, in the full-color mode, as shown in FIG. 1, the two-color printing process section 12 performs no processing on the image data sent from the image-quality adjustment section 11 and passes the image data directly on to the color correction section 13. Furthermore, in the single-color mode, as shown in (a) of FIG. 2, two-color printing process section 12 performs no processing on the CMY image data sent from the image-quality adjustment section 11 and passes the image data directly on to the color correction section 13.

The color correction section 13 is a block that, in the full-color mode, receives RGB image data from the two-color printing process section 12, performs a color correction process of converting the RGB image data into CMY image data, and performs a process of improving the color reproducibility of the image data. The color correction process is realized by creating an LUT (look-up table) of input values (RGB) and output values (CMY) associated with one another and looking up the output values in the created LUT.

Further, in the single-color mode or two-color mode, as shown in FIG. 2, the color correction section 13 performs no processing on the CMY image data sent from the two-color printing process section 12 and passes the image data directly on to the black generation and under color removal section 14.

The black generation and under color removal section 14 is a block that, in the full-color mode or two-color mode, receives CMY image data from the color correction section 13, generates black (K) image data from the CMY image data, and generate new CMY image data by subtracting the black (K) image data from the original CMY image data. Thus, in the full-color mode or two-color mode, as shown in FIG. 1 or (b) of FIG. 2, the black generation and under color removal section 14 converts the CMY image data into four colors of image data CMYK.

Further, in the single-color mode, as shown in (a) of FIG. 2, the black generation and under color removal section 14 performs no processing on the CMY image data sent from the color correction section 13 and passes the image data directly on to the subsequent spatial filter section 15.

In the full-color mode or two-color mode, the output from the black generation and under color removal section 14 and the input to and output from each block subsequent to the black generation and under color removal section 14 are CMYK image data as shown in FIG. 1. Meanwhile, in the single-color mode, the output from the black generation and under color removal section 14 and the input to and output from each block subsequent to the black generation and under color removal section 14 are CMY image data unlike in FIG. 1.

The spatial filter section 15 receives the CMYK or CMY image data from the black generation and under color removal section 14 and performs a spatial filter process (e.g., edge enhancement process, smoothing process) on the image data by a digital filter in accordance with the segmentation class signals. That is, the spatial filter section 15 executes image processing differently for each image area in accordance with the segmentation class signals.

The enlarging/reducing section 16 is a block that enlarges or reduces an image in accordance with an enlarging/reducing command (information indicating the zoom ratio of a printed image) inputted by the user from the operation panel (not shown).

The output tone correction section 17 is a block that receives image data from the enlarging/reducing section 16 and performs output gamma correction for outputting the image data onto a recording medium such as a sheet of paper. The halftone generation section 18 executes, by dithering or error diffusion, a tone reproduction process (halftone generation process) necessary for the image output apparatus 103 to print an image.

Then, the halftone generation section 18 passes the CMYK or CMY image data on to the image output apparatus 103, and the image output apparatus 103 prints an image of the image data onto a recording medium (e.g., a sheet of paper).

(1-2) Preview Display

Figure 3:
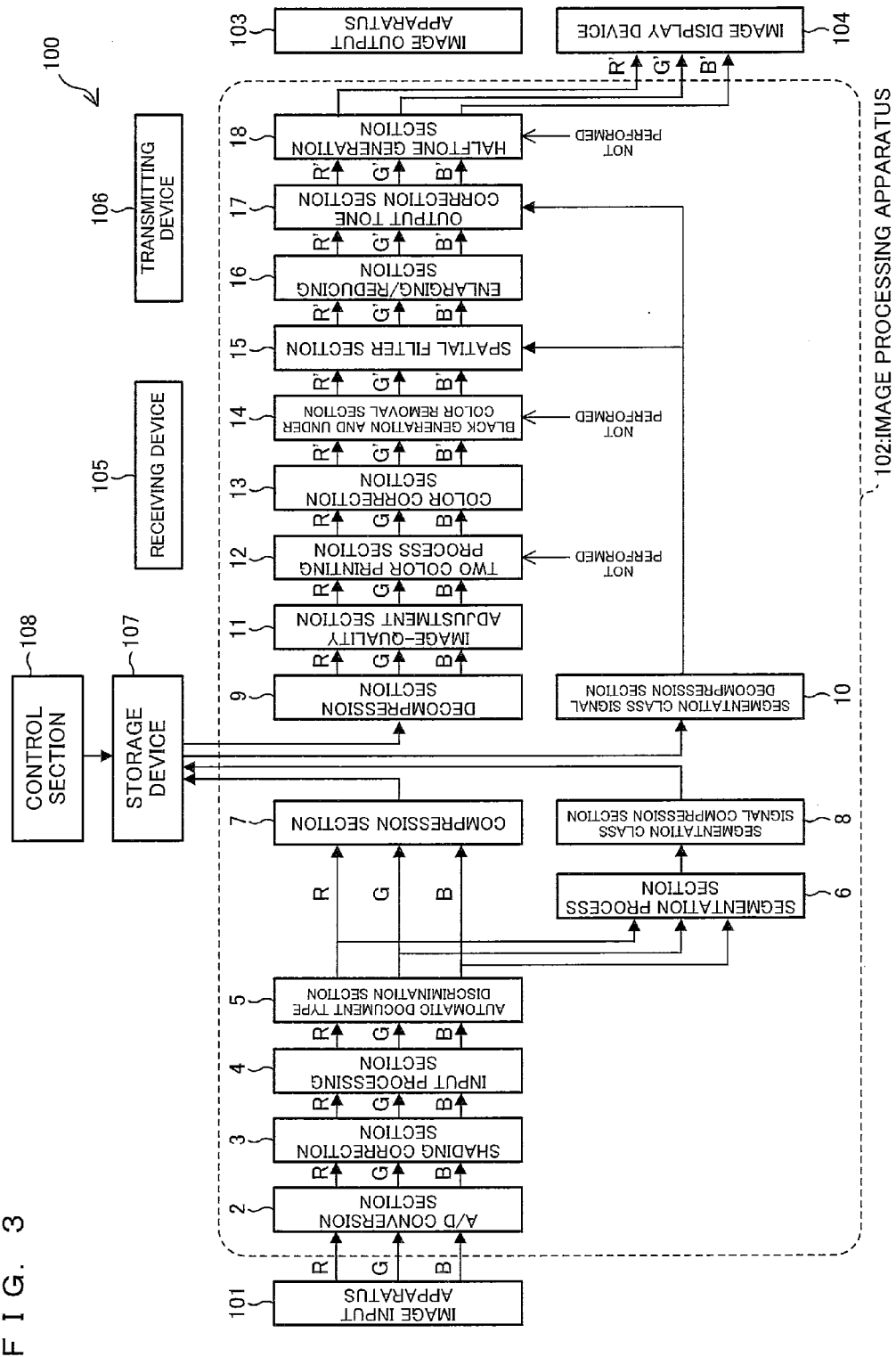
FIG. 3
FIG. 3 is a block diagram showing the image forming apparatus of the present embodiment and showing the flow of image data in a preview display process in the copier mode and the full-color mode.

Next, the processes that are executed by the blocks of the image processing apparatus 102 in cases where a preview of an image to be printed is displayed in the copier mode are described with reference to FIG. 3. FIG. 3 is a block diagram showing the same image forming apparatus 100 as in FIG. 1 and showing the flow of image data at the time of a preview display process in the copier mode and the full-color mode.

It should be noted that because the A/D (analog/digital) conversion section 2, the shading correction section 3, the input processing section 4, the automatic document type discrimination section 5, the segmentation process section 6, the compression section 7, the segmentation class signal compression section 8, the decompression section 9, the image-quality adjustment section 11, and the two-color printing process section 12 perform the same processes as in the case of a printing process, such processes will not be described below.

At the time of a preview display, as shown in FIG. 3, the segmentation class signal decompression section 10 decompresses (decodes) segmentation class signals and passes them on to the spatial filter section 15 and the output tone correction section 17.

In the full-color mode, the color correction section 13 receives RGB image data in color space of the scanner (image input apparatus 101). Then, the color correction section 13 converts the RGB image data into R'G'B' image data in color space of the image display device 104.

That is, the color correction section 13 converts the RGB image data, which conform to the image scanning characteristics of the scanner, into the R'G'B' image data, which conform to the display characteristics of the display device. It should be noted that the conversion of the RGB image data into the R'G'B' image data is also realized by creating an LUT (look-up table) of input values (RGB) and output values (R'G'B') associated with one another and looking up the output values in the created LUT.

Moreover, in the full-color mode, the present embodiment uses the same image processing circuit for the conversion of RGB image data into CMYK image data at the time of a printing process and the conversion of RGB image data into R'G'B' image data at the time of a preview display.

Figure 4:
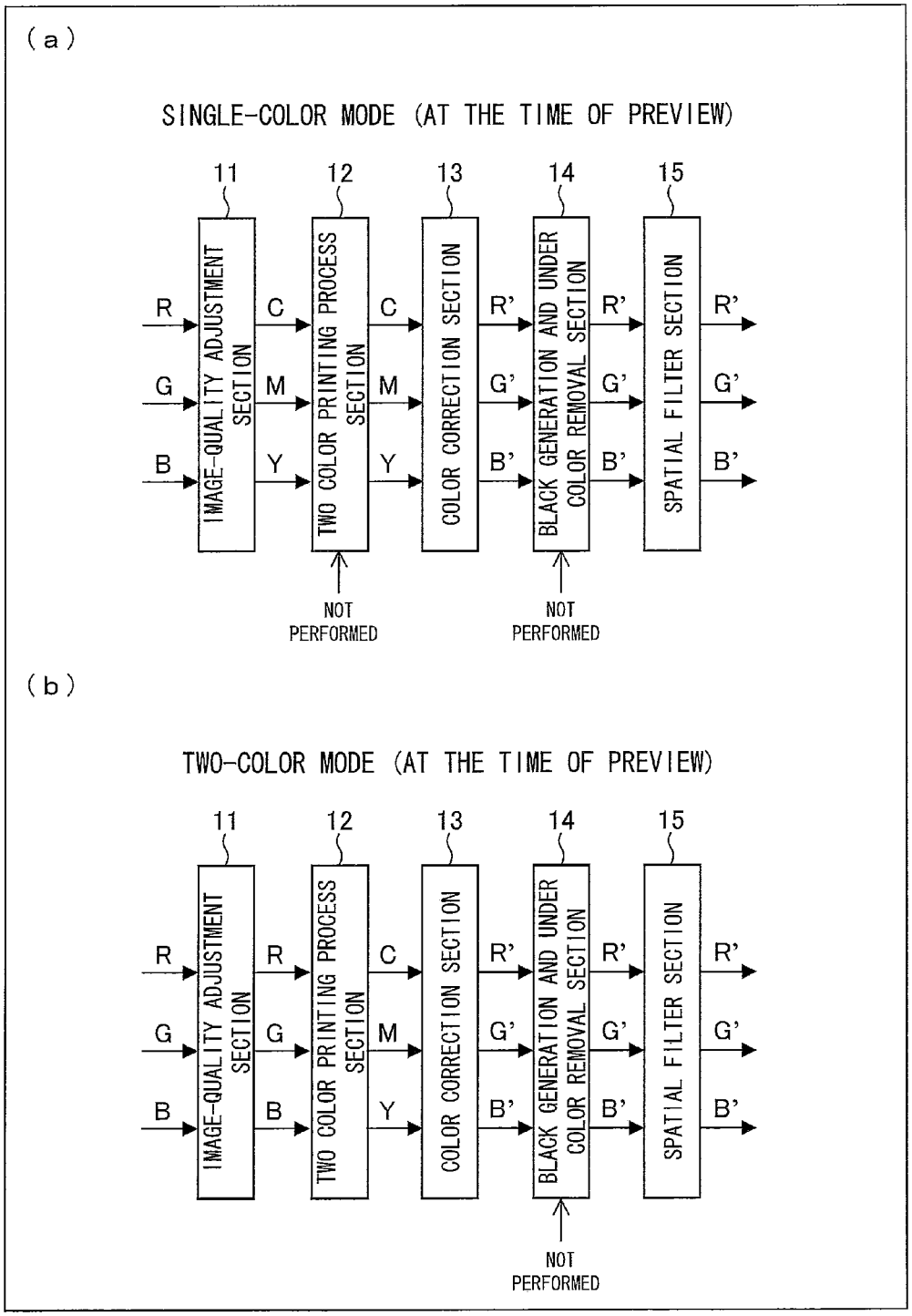
FIG. 4
FIG. 4 shows block diagrams showing a part inside of the image processing apparatus (a) performing a preview display in the copier mode and the singe-color mode and (b) performing a preview display in the copier mode and the two-color mode.

As with FIG. 1, FIG. 3 shows the image forming apparatus 100 in the full-color mode. In the full-color mode, the color correction section 13 receives RGB image data. Meanwhile, in the single-color mode or two-color mode, as shown in FIG. 4, the color correction section 13 receives CMY image data. (a) of FIG. 4 shows some blocks of the image processing apparatus 2 performing a preview display in the copier mode and the singe-color mode, and (b) of FIG. 4 shows some blocks of the image processing apparatus performing a preview display in the copier mode and the two-color mode.

Then, in the single-color mode or two-color mode, the color correction section 13 converts the CMY image data into R'G'B' image data. That is, the color correction section 13 converts the CMY image data, which conform to the printing characteristics of the printing process, into the R'G'B' image data, which conform to the display characteristics of the display device. It should be noted that the conversion of the CMY image data into the R'G'B' image data is also realized by creating an LUT (look-up table) of input values (RGB) and output values (R'G'B') associated with one another and looking up the output values in the created LUT.

In any one of the single-color mode, the two-color mode, and the full-color mode, as shown in FIGS. 3 and 4, the black generation and under color removal section 14 performs no processing on the R'G'B' image data sent from the color correction section 13 and passes the image data directly on to the subsequent spatial filter section 15.

The spatial filter section 15 receives the R'G'B' image data from the black generation and under color removal section 14 and performs a spatial filter process (e.g., edge enhancement process, smoothing process) on the image data by a digital filter in accordance with the segmentation class signals. That is, as in the case of a printing process, the spatial filter section 15 executes image processing differently for each image area in accordance with the segmentation class signals.

The enlarging/reducing section 16 performs a downsampling process by which the number of pixels of an image composed of the R'G'B' image data sent from the spatial filter section 15 is converted into the number of pixels of the image display device 104 (process by which the number of pixels is reduced). The image display device 104, provided in the operation panel of the image forming apparatus 100, is lower in resolution than image data to be printed and, usually, is an extremely small display. Therefore, at the time of a preview display, it is necessary to downsample the image data. Further, the enlarging/reducing section 16 enlarges or reduces the image in accordance with an enlarging/reducing command (information indicating the zoom ratio of a display, e.g., a fixed zoom ratio of 2 to 4 times) inputted from the operation panel (not illustrated) provided in the image forming apparatus.

Figure 5:
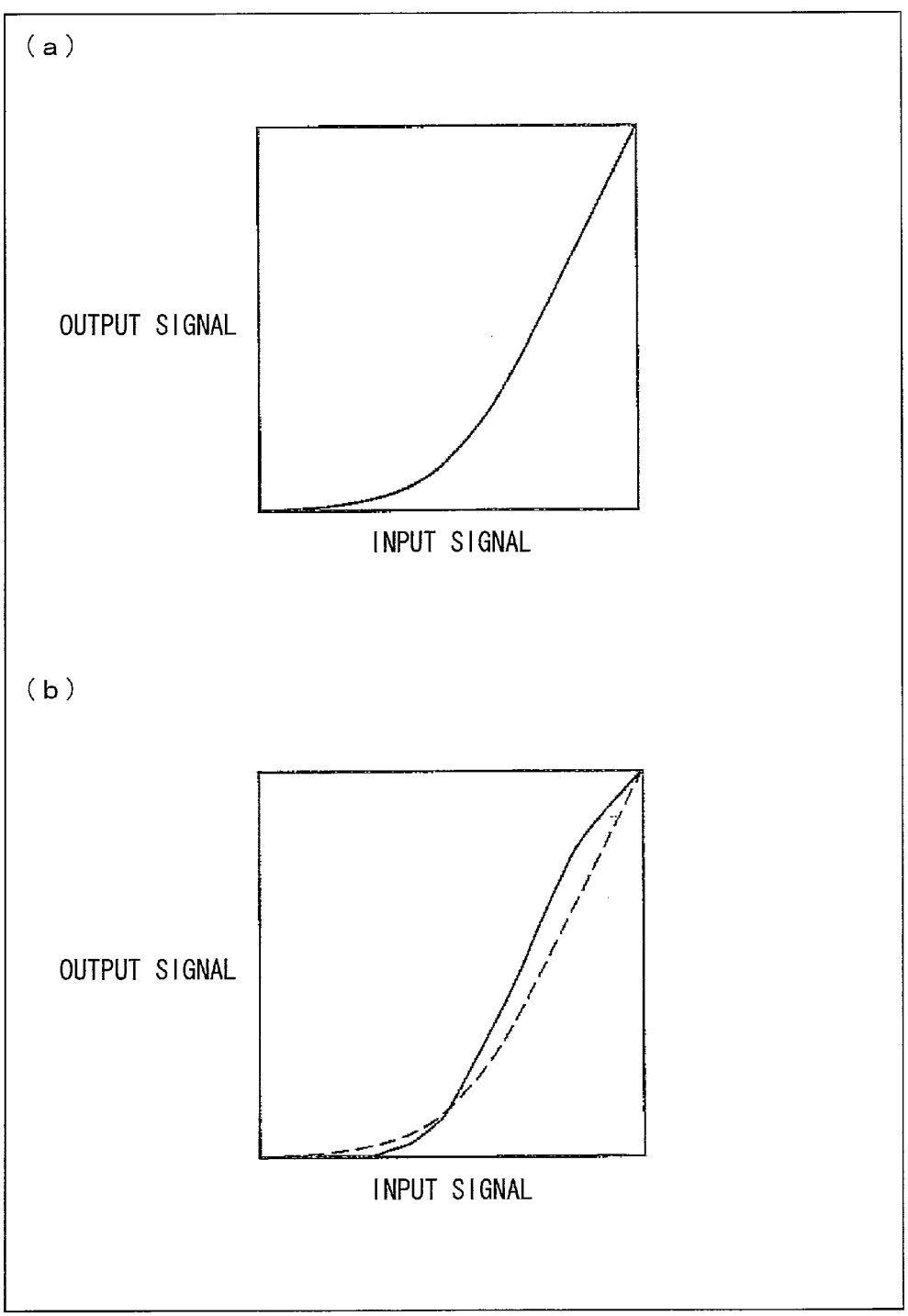
FIG. 5
FIG. 5 shows gamma curves, i.e., (a) an example of a gamma curve corresponding to the display characteristics of an image display device and (b) a solid line representing a gamma curve for texts to be sharply displayed and a dotted line representing a gamma curve corresponding to the display characteristics of the image display device.

The output tone correction section 17 receives the image data from the enlarging/reducing section 16 and performs output gamma correction on the image data in accordance with the segmentation class signals. More specifically, in accordance with the segmentation class signals, the output tone correction section 17 selects different gamma curves for different image areas and varies in output gamma correction from one image area to another. For example, for nontext areas, the output tone correction section 17 selects a gamma curve corresponding to the display characteristics of the image display device 104, and for text areas, selects a gamma curve for texts to be sharply displayed. (a) of FIG. 5 shows a gamma curve corresponding to the display characteristics of the image display device 104, and (b) of FIG. 5 shows a solid line representing a gamma curve for texts to be sharply displayed and a dotted line representing a gamma curve corresponding to the display characteristics of the image display device 14. The dotted line is shown for comparison with the gamma curve for texts to be sharply displayed.

In the present embodiment, the output tone correction section 17 selects between the gamma curves in accordance with the segmentation class signals. However, the output tone correction section 17 may perform output tone correction by using only the gamma curve of (a) of FIG. 5, instead of making selection in accordance with the segmentation class signals.

Then, the halftone generation section 18 performs no processing on the R'G'B' image data sent from the output tone correction section 17 and passes the image data directly on to the subsequent image display device 104. This allows the image display device 104 to display, in accordance with the R'G'B' image data, a preview of an image to be copied.

It should be noted that in place of the output tone correction section 17, the image-quality adjustment section 11 may execute output gamma correction.

(1-3) As to Whether the Blocks Operate or Do Not Operate

As described above, at the time of printing in the full-color mode, the image-quality adjustment section 11 through the halftone generation section 18 all operate except for the two-color printing process section 12 (see FIG. 1). Meanwhile, at the time of a preview display in the full-color mode, the image-quality adjustment section 11 through the halftone generation section 18 all operate except for the two-color printing process section 12, the black generation and under color removal section 14, and the halftone generation section 18 (see FIG. 3).

Further, at the time of printing in the two-color mode, the image-quality adjustment section 11 through the halftone generation section 18 all operate except for the color correction section 13 (see (b) of FIG. 2). Meanwhile, at the time of a preview display in the two-color mode, the image-quality adjustment section 11 through the halftone generation section 18 all operate except for the black generation and under color removal section 14 and the halftone generation section 18 (see (b) of FIG. 4).

Furthermore, at the time of printing in the single-color mode, the image-quality adjustment section 11 through the halftone generation section 18 all operate except for the two-color printing process section 12, the color correction section 13, and the black generation and under color removal section 14 (see (a) of FIG. 2). Meanwhile, at the time of a preview display in the single-color mode, the image-quality adjustment section 11 through the halftone generation section 18 all operate except for the two-color printing process section 12, the black generation and under color removal section 14, and the halftone generation section 18 (see (a) of FIG. 4).

(1-4) Steps of a Process

Figure 6:
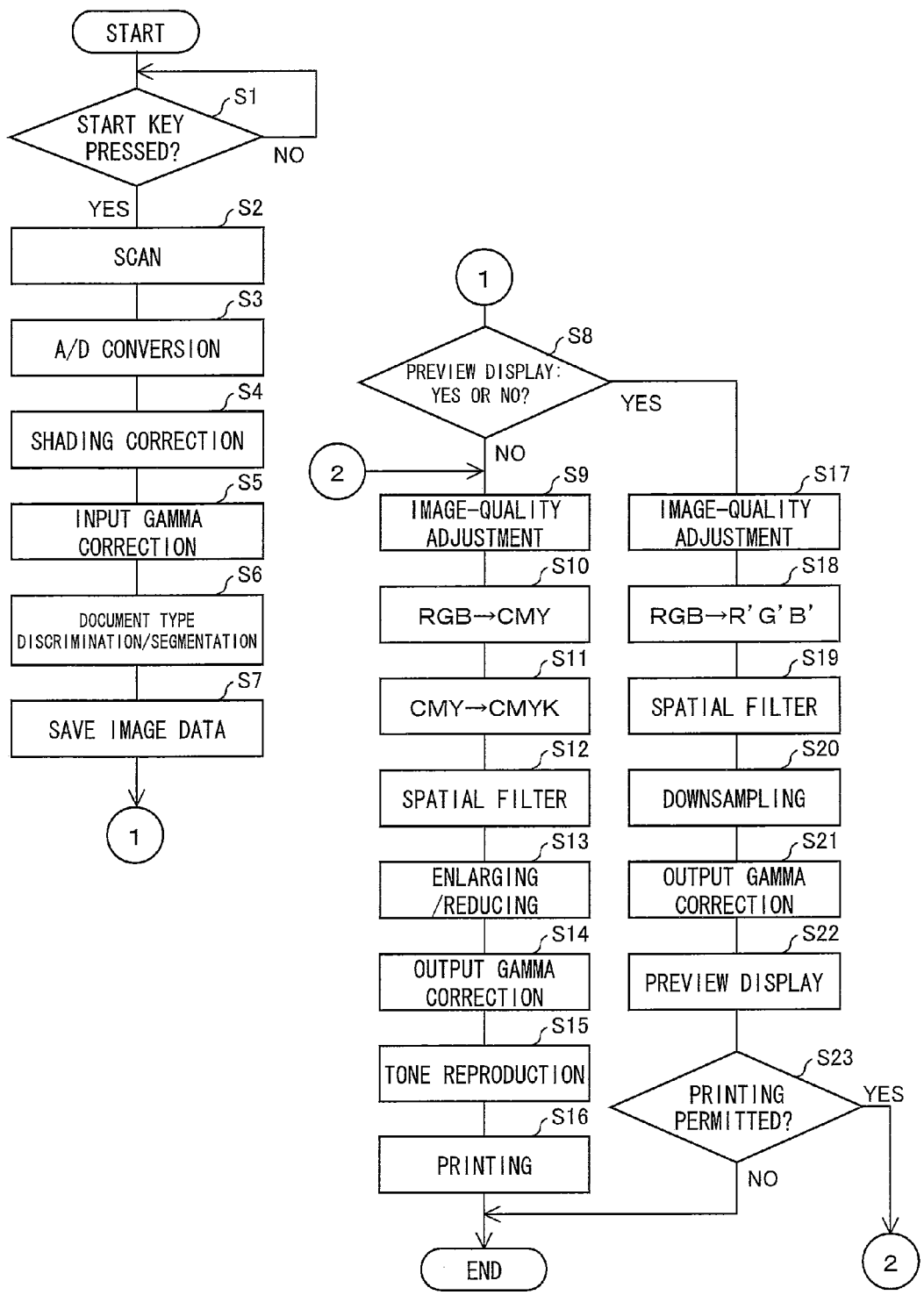
FIG. 6

Next, an example of steps of a process in the copier mode and the full-color mode is described with reference to FIG. 6. FIG. 6 is a flow chart showing an example of steps of a process that is performed by the image forming apparatus in the copier mode and the full-color mode.

In response to a pressing of a start key (YES in S1) in the copier mode, the image forming apparatus 100 generates RGB analog signals by scanning a document (S2). It is assumed here that prior to the pressing of the start key in S1, the user inputs setting information indicating whether or not a preview display is necessary and thereby sets whether or not the image forming apparatus 100 performs a preview display.

After S2, the image forming apparatus 100 converts the RGB analog signals into RGB image data (digital data) (S3), subjects the RGB image data to shading correction (S4), and then subjects the RGB image data to input gamma correction (S5). After S5, the image forming apparatus 100 performs a document type discrimination process and a segmentation process in accordance with the RGB image data (S6), and then stores the RGB image in the storage device 107 (S7).

After S7, the image forming apparatus 100 judges whether or not it has been set to "Preview Display: Yes" (S8). In cases where it has not been set to "Preview Display: Yes", the image forming apparatus 100 executes Steps S9 through S16. In cases where it has been set to "Preview Display: Yes", the image forming apparatus 100 executes Steps S17 through S23. In the following, Steps S9 through S16 are described first, and then Steps S17 through S23 are described.

In cases where the image forming apparatus 100 has not been set to "Preview Display: Yes" (NO in S8), the image forming apparatus 100 reads out the RGB image data from the storage device 107, and then performs an image-quality adjustment process such as background removal correction and adjustment of intensity (S9). After that, the image forming apparatus 100 converts the RGB image data, which conforms to the characteristics of the scanner, into CMY image data conforming to the characteristics of the printer (S10), and then converts the CMY image data into CMYK image data (S11). After that, the image forming apparatus 100 performs a spatial filter process on the CMYK image data in accordance with a result of the segmentation process (S12), and then performs an enlarging/reducing process on the CMYK image data (S13). After S13, the image forming apparatus 100 performs output gamma correction and a tone reproduction process on the CMYK image data (S14, S15), prints an image of the image data on a sheet of paper (S16), and then finishes the process.

In cases where the image forming apparatus 100 judges, in S8, that it has been set to "Preview Display: Yes" (YES in S8), the image forming apparatus 100 reads out the RGB image data from the storage device 107, and then performs the same image-quality adjustment process as in S9 (S17). After that, the image forming apparatus 100 converts the RGB image data, which conforms to the characteristics of the scanner, into R'G'B' image data conforming to the characteristics of the display device (S18). After S18, the image forming apparatus 100 performs a spatial filter process on the R'G'B' image data in accordance with a result of the segmentation process (S19), and then performs a downsampling process on the R'G'B' image data so that the R'G'B' image data conforms to the resolution and size of the display (S20). After S20, the image forming apparatus 100 performs output gamma correction on the R'G'B' image data in accordance with the result of the segmentation process (S21). After S21, the image forming apparatus 100 performs a preview display in accordance with the R'G'B' image data (S22). Then, after S22, upon receiving, from the user, a command indicating permission of printing (YES in S23), the image forming apparatus 100 again reads out the RGB image data from the storage device 107, and then performs printing by executing Steps S9 through S16 in accordance with the image data. On the other hand, after S22, upon receiving, from the user, a command indicating cancellation of printing (NO in S23), the image forming apparatus 100 finishes the process.

(2) Facsimile Transmission Mode (2-1) Transmission Process (Image Transmission Job)

Figure 7:
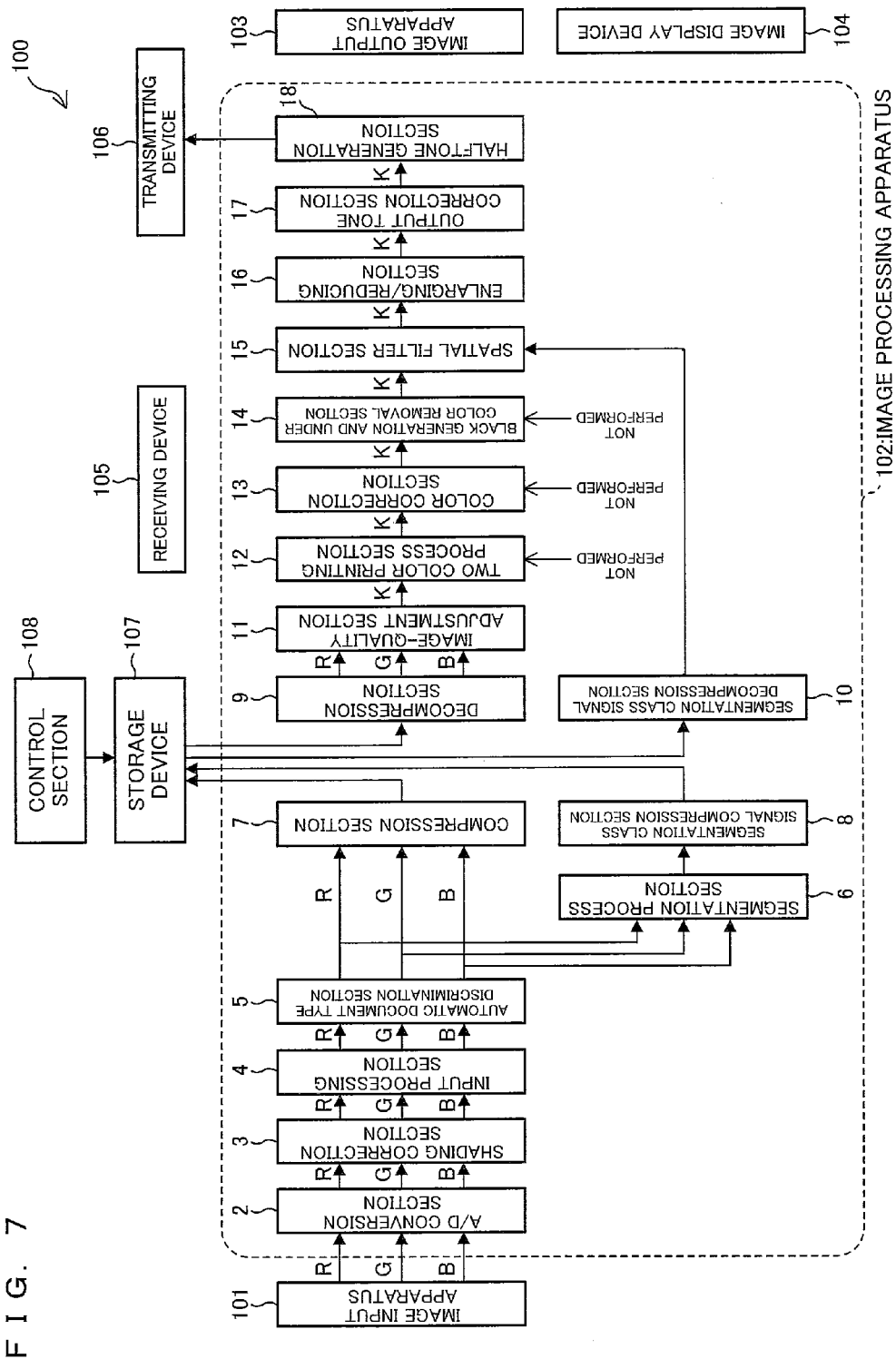
FIG. 7

FIG. 7 is a block diagram showing the same image forming apparatus 100 as in FIG. 1 and showing the flow of image data in a transmission process in the facsimile transmission mode. It should be noted that because the A/D (analog/digital) conversion section 2, the shading process section 3, the input processing section 4, the automatic document type discrimination section 5, the segmentation process section 6, the compression section 7, the segmentation class signal compression section 8, and the decompression section 9 performs the same processes as in the case of the copier mode, such processes will not be described below.

In the facsimile transmission mode, the segmentation class signal decompression section 10 reads out the segmentation class signal codes from the storage device 107, decompresses the segmentation class signal codes, and then transmits the decompressed (decoded) segmentation class signal codes to the spatial filter section 15.

The image-quality adjustment section 11 receives the RGB image data from the decompression section 9 and converts the RGB image into K image data (a value indicating grayscale). It should be noted that this conversion is performed by using a predetermined matrix of coefficients and Eq. (2) below:

Luminance (Value of $K$ Image Data)=$0.299r+0.587g+0.114b$      Eq. (2)

where r is the value (density) of red image data, g is the value of green image data, and b is the value of blue image data.

The two-color printing process section 12, the color correction section 13, and the black generation and under color removal section 14 perform no processing on the K image data (signal) sent from the image-quality adjustment section 11 and pass the K image data directly on to the subsequent spatial filter section 15.

The spatial filter section 15 performs a spatial filter process (e.g., edge enhancement process, smoothing process) on the K image data by a digital filter in accordance with the segmentation class signals. The enlarging/reducing section 16 performs an enlarging/reducing process on the K image data in accordance with the transmission resolution. The output tone correction section 17 performs output gamma correction (gamma correction for output onto a recording medium such as a sheet of paper) on the K image data sent from the enlarging/reducing section 16. The halftone generation section 18 converts the K image data into binarized image data, for example, by error diffusion. Then, the binarized image data are rotated by a rotation process section (not shown) as needed, compressed by a compression/decompression section (not shown) into a predetermined form, and then stored in a memory (not shown).

After that, the transmitting device (e.g., modem) 106 performs a procedure for transmission to the destination and ensures transmittability to the destination. Then, the transmitting device 106 reads out the binarized image data, stored in the memory, with the binarized image data compressed in the predetermined form, subjects the binarized image data to necessary processes such as a conversion in compression format, and then transmits the binarized image data in sequence via a communication line.

(2-2) Preview Display

Figure 8:
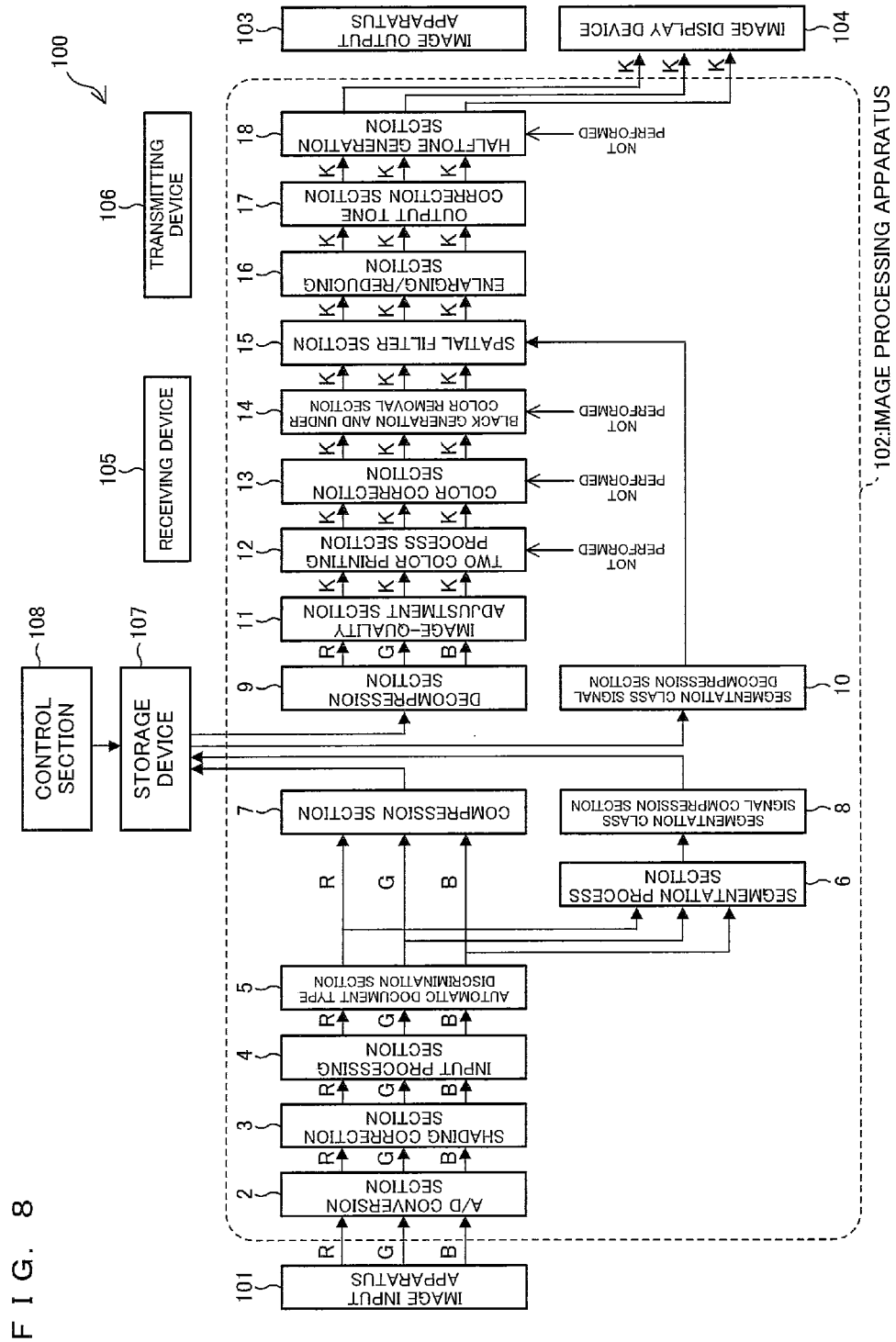
FIG. 8

FIG. 8 is a block diagram showing the same image forming apparatus 100 as in FIG. 1 and showing the flow of image data in a preview display process in the facsimile transmission mode. The term "preview display in the facsimile transmission mode" here means a process of displaying a preview of an image to be transmitted by facsimile.

At the time of a preview display, the A/D conversion section 2, the shading correction section 3, the input processing section 4, the automatic document type discrimination section 5, the segmentation process section 6. the compression section 7, the segmentation class signal compression section 8, the decompression section 9, the segmentation class signal decompression section 10, the image-quality adjustment section 11, and the spatial filter section 15 perform the same processes as in the case of a facsimile transmission process; therefore, such processes are not described. Further, as in the case of a facsimile transmission process, the two-color printing process section 12, the color correction section 13, and the black generation and under color removal section 14 do not perform any processes.

However, at the time of a preview display, unlike in the case of a transmission process, as shown in FIG. 8, three pieces of K image data (all being equal in value) are transmitted for each pixel all the way from the image-quality adjustment section 11 to the image display device 104. This is because the image display device 104 is a full-color model and as such requires three values (pieces of image data) for one pixel.

The enlarging/reducing section 16 performs a downsampling process on the K image data so that the number of pixels of an image composed of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image to be transmitted by facsimile.

Further, at the time of a preview display process in the facsimile transmission mode, the image-quality adjustment section 11 converts the RGB image data into three pieces of K image data. However, there is no such limitation in embodiment. For example, it is possible to perform image processing without converting RGB image data into K image data up to the output tone correction section 17, to receive the RGB image data from the output tone correction section 17, and to convert the RGB image data into K image data by a browser.

(2-3) As to Whether the Blocks Operate or Do Not Operate

As described above, at the time of a transmission process in the facsimile transmission mode, the image-quality adjustment section 11 through the halftone generation section 18 all operate except for the two-color printing process section 12, the color correction section 13, and the black generation and under color removal section 14 (see FIG. 7). Meanwhile, at the time of a preview display in the facsimile transmission mode, the image-quality adjustment section 11 through the halftone generation section 18 all operate except for the two-color printing process section 12, the color correction section 13, the black generation and under color removal section 14, and the halftone generation section 18 (see FIG. 8).

(2-4) Steps of a Process

Next, an example of steps of a process in the facsimile transmission mode is described. In cases where the image forming apparatus 100 receives a fax transmission command from the user with the image forming apparatus 100 having not been set to "Preview Display: Yes", the image forming apparatus 100 processes image data as shown in FIG. 7 and transmits the image data to an external apparatus.

Meanwhile, in cases where the image forming apparatus 100 receives a fax transmission command from the user with the image forming apparatus 100 set to "Preview Display: Yes", the image forming apparatus 100 processes image data as shown in FIG. 8, thereby storing the image data in the storage device 107 and displaying a preview of an image of the image data on the image display device 104. Then, when the image forming apparatus 100 receives a transmission permission command from the user with the preview being displayed, the image forming apparatus 100 reads out the image data from the storage device 107, processes the image data in the decompression section 9 through the halftone generation section 18 as shown in FIG. 7, and transmits the image data to an external apparatus via the transmitting device 106.

(3) Facsimile Reception Mode (3-1) Printing Process (Image Print Job)

Figure 9:
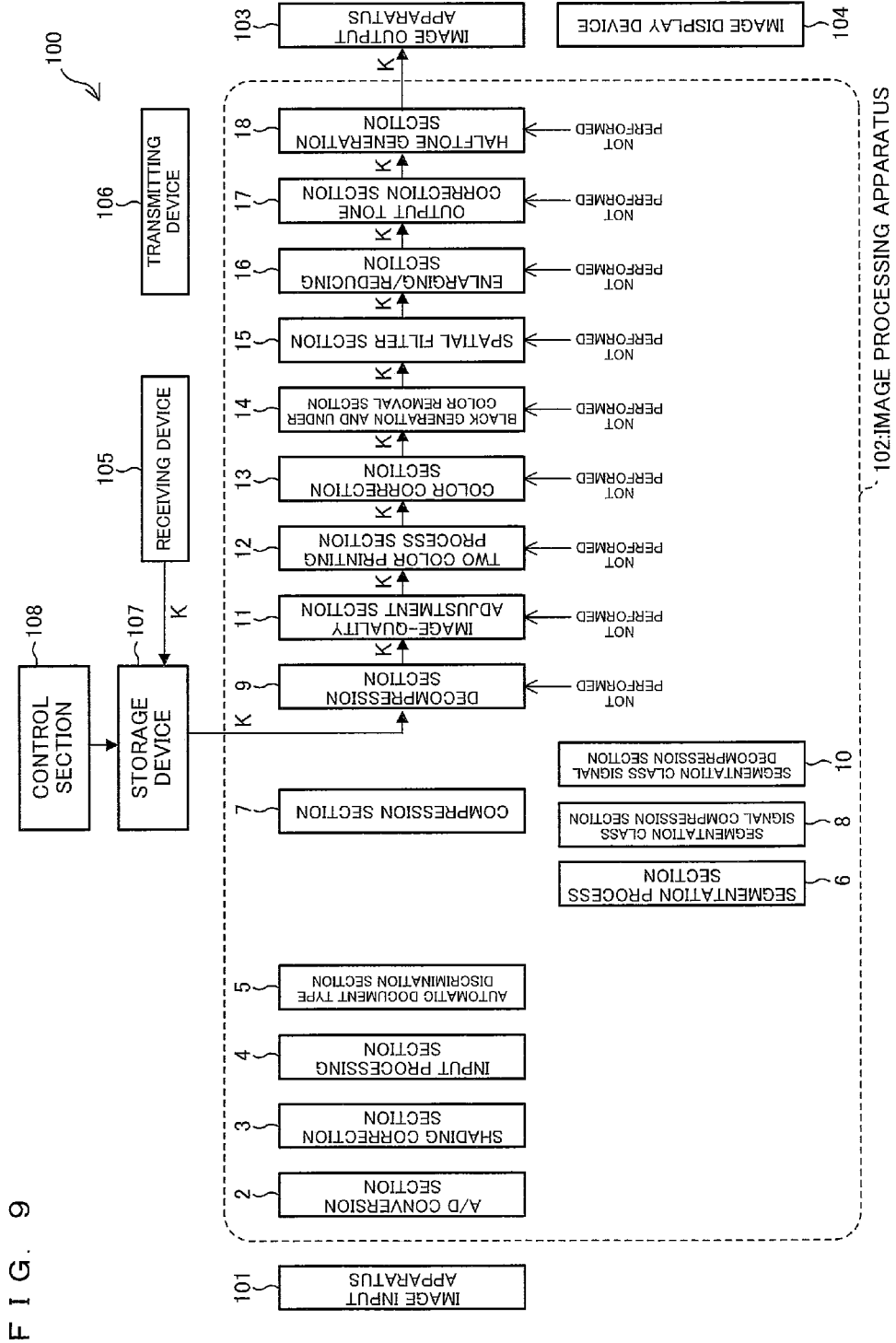
FIG. 9

FIG. 9 is a block diagram showing the same image forming apparatus 100 as in FIG. 1 and showing the flow of image data in a printing process in the facsimile reception mode.

In the case of facsimile reception, the receiving device 105 receives K image data (1 bit) from the source while performing a communication procedure. Then, the K image data received by the receiving device 105 are decompressed by the compression/decompression section (not shown), rotated by the rotation process section (not shown) as needed, and then subjected to a resolution conversion process by a resolution conversion section (not shown). After that, the image data are stored temporarily in the storage device 107.

Furthermore, the image data written in the storage device 107 are passed on to the decompression section 9 of the image processing apparatus 102 by the control section 108. The decompression section 9, the image-quality adjustment section 11, the two-color printing process section 12, the color correction section 13, the black generation and under color removal section 14, the spatial filter section 15, the enlarging/reducing section 16, the output tone correction section 17, and the halftone generation section 18 perform no processing on the image data sent from the storage device 107 and pass the image data directly onto the subsequent image output apparatus 103. The image output apparatus 103 forms an image on a recording medium (e.g., a sheet of paper) in accordance with the K image data sent from the halftone generation section 18. In the case of a printing process in the facsimile reception mode, image processing is not performed as described above. Therefore, the image data stored in the storage device 107 may be outputted directly to the image output apparatus 103.

(3-2) Preview Display

Figure 10:
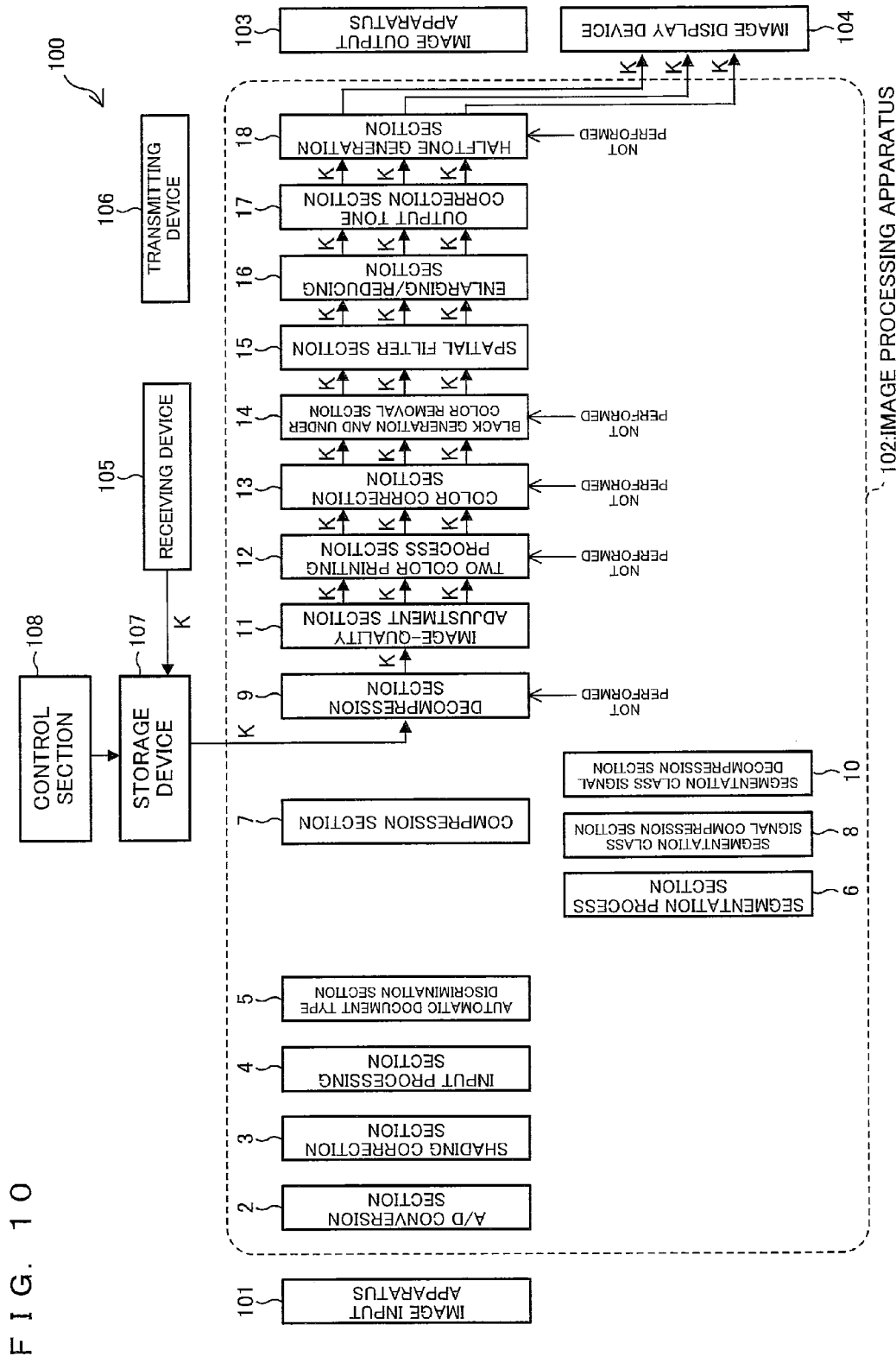
FIG. 10

FIG. 10 is a block diagram showing the same image forming apparatus 100 as in FIG. 1 and showing the flow of image data in a preview display process in the facsimile reception mode. The term "preview display in the facsimile reception mode" here means a process of, before printing an image of image data received by facsimile, displaying a preview of the image to be printed.

Also at the time of a preview display in the facsimile reception mode, as in the case of a printing process in the facsimile reception mode, the image data written in the storage device 107 are passed on to the decompression section 9 of the image processing apparatus 102 by the control section 108. The decompression section 9 performs no processing on the image data sent from the storage device 107 and passes the image data on to a bit-number conversion process section (not shown). Then, the bit-number conversion process section converts the number of bits of the image data sent from the decompression section 9 (e.g., from 1 bit to 8 bits), and then passes the image data on to the image-quality adjustment section 11. That is, although not shown in FIG. 10, the decompression section 9 and the image-quality adjustment section 11 has the bit-number conversion section provided therebetween.

As shown in FIG. 10, for each pixel, the image-quality adjustment section 11 receives one piece of K image data and generates and outputs three pieces of K image data (all being equal in value). This is because the image display device 104 is a full-color model and as such requires three values for one pixel.

After that, the two-color printing process section 12, the color correction section 13, and the black generation and under color removal section 14 perform no processing on the K image data sent from the image-quality adjustment section 11 and pass the image data directly on the subsequent spatial filter section 15. The spatial filter section 15 performs a blur (smoothing) process and the like on the K image data with use of a digital filter.

The enlarging/reducing section 16 performs a downsampling process on the K image data so that the number of pixels of an image of the K image data sent from the spatial filter section 15 conforms to the number of pixels of the display size of the image display device 104. Further, the enlarging/reducing section 16 enlarges or reduces the image in accordance with an enlarging/reducing command (information indication the zoom ratio of a display, e.g., a fixed zoom ratio of 2 to 4 times) inputted from the operation panel (not shown) provided in the image forming apparatus 100.

The output tone correction section 17 receives the K image data from the enlarging/reducing section 16 and performs output gamma correction on the K image data in conformity to the display characteristics of the image display device 104. Then, the halftone generation section 18 performs no processing on the K image data sent from the output tone correction section 17 and passes the K image data directly on to the subsequence image display device 104. This allows the image display device 104 to display, in accordance with the K image data, a preview of an image received by facsimile.

(3-3) As to Whether the Blocks Operate or Do Not Operate

As described above, at the time of a printing process in the facsimile reception mode, the image-quality adjustment section 11 through the halftone generation section 18 do not operate (see FIG. 9). Meanwhile, at the time of a preview display in the facsimile reception mode, the image-quality adjustment section 11 through the halftone generation section 18 all operate except the two-color printing process section 12, the color correction section 13, the black generation and under color removal section 14, and the halftone generation section 18 (see FIG. 10).

(3-4) Steps of a Process

Next, an example of steps of a process in the facsimile reception mode is described. In cases where the image forming apparatus 100 receives image data by facsimile, the received image data are written temporarily in the storage device 107. It should be noted here that there is a time lag between the writing of the image data in the storage device 107 and printing of an image. In cases where the user inputs a "preview command" during the time lag, the image data is processed along such a flow as shown in FIG. 10, and a preview of an image of the image data is displayed by the image display device 104. Further, when the image is printed, the image data is processed along such a flow as shown in FIG. 9, and the image of the image data is printed by the image output apparatus 103.

(4) Image Transmission Mode (4-1) Transmission Process (Image Transmission Job)

In the case of operation of the image forming apparatus 100 at the time of a transmission process in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, and the decompression section 9 performs the same processes as in the case of the copier mode. It should be noted that the segmentation class signal decompression section 10 supplies the segmentation class signals to the spatial filter section 15 and the output tone correction section 17.

Then, the image-quality adjustment section 11 performs a background removal process and color balance adjustment. The color correction section 13 converts the image data into R"G"B" image data (e.g., sRGB data) conforming to the display characteristics of a commonly-used display device. The spatial filter section 15 performs a spatial filter process (edge enhancement process, smoothing process) by a digital filter in accordance with the segmentation class signals. The enlarging/reducing section 16 enlarges or reduces the image. Further, the output tone correction section 17 performs correction on a text area with use of the gamma curve of (b) of FIG. 5, and performs correction on a nontext area with use the gamma curve of (a) of FIG. 5, for example. The two-color printing process section 12 and the black generation and under color removal section 14 perform no processing on the input image data, and each of the blocks passes the image data directly on to the subsequent block. Therefore, the output tone correction section 17 outputs the R"G"B" image data.

Furthermore, the R"G"B" image data from the output tone correction section 17 are converted into an image file such as a PDF file by a format conversion process section (not shown). Then, in the scan to e-mail mode, which is an image transmission mode, the image file is attached to an e-mail by the mail processing section (job apparatus; not shown), and the e-mail is transmitted to the destination via a network. Alternatively, in the scan to ftp mode, which is another image transmission mode, the image file is transmitted to a predetermined folder. Alternatively, in the scan to usb mode, which is the other image transmission mode, the image file is transmitted to a predetermined USB memory.

(4-2) Preview Display

In the case of operation of the image forming apparatus 100 at the time of a preview display in the image transmission mode, the image input apparatus 101, the A/D (analog/digital) conversion section 2, the shading correction section 3, the input processing section 4, the automatic document type discrimination section 5, the segmentation process section 6, the compression section 7, the segmentation class signal compression section 8, the decompression section 9, the segmentation class signal decompression section 10, the image-quality adjustment section 11, and the two-color printing process section 12 perform the same processes as in the case of transmission in the image transmission mode.

Then, at the time of a preview display in the image transmission mode, the color correction section 13 converts the RGB image data into R'G'B' image data conforming to the color space of the image display device 104.

After that, as in the case of transmission, the spatial filter section 15 performs a spatial filter process (edge enhancement process, smoothing process) by a digital filter in accordance with the segmentation class signals. The enlarging/reducing section 16 performs a downsampling process for a match in size for the image display device 104. Further, the output tone correction section 17 performs correction on a text area with use of the gamma curve of (b) of FIG. 5, and performs correction on a nontext area with use the gamma curve of (a) of FIG. 5, for example.

Then, the output tone correction section 17 supplies the R'G'B' image data to the image display device 104, and the image display device 104 performs a preview display in accordance with the R'G'B' image data.

(5) Modification

Figure 11:
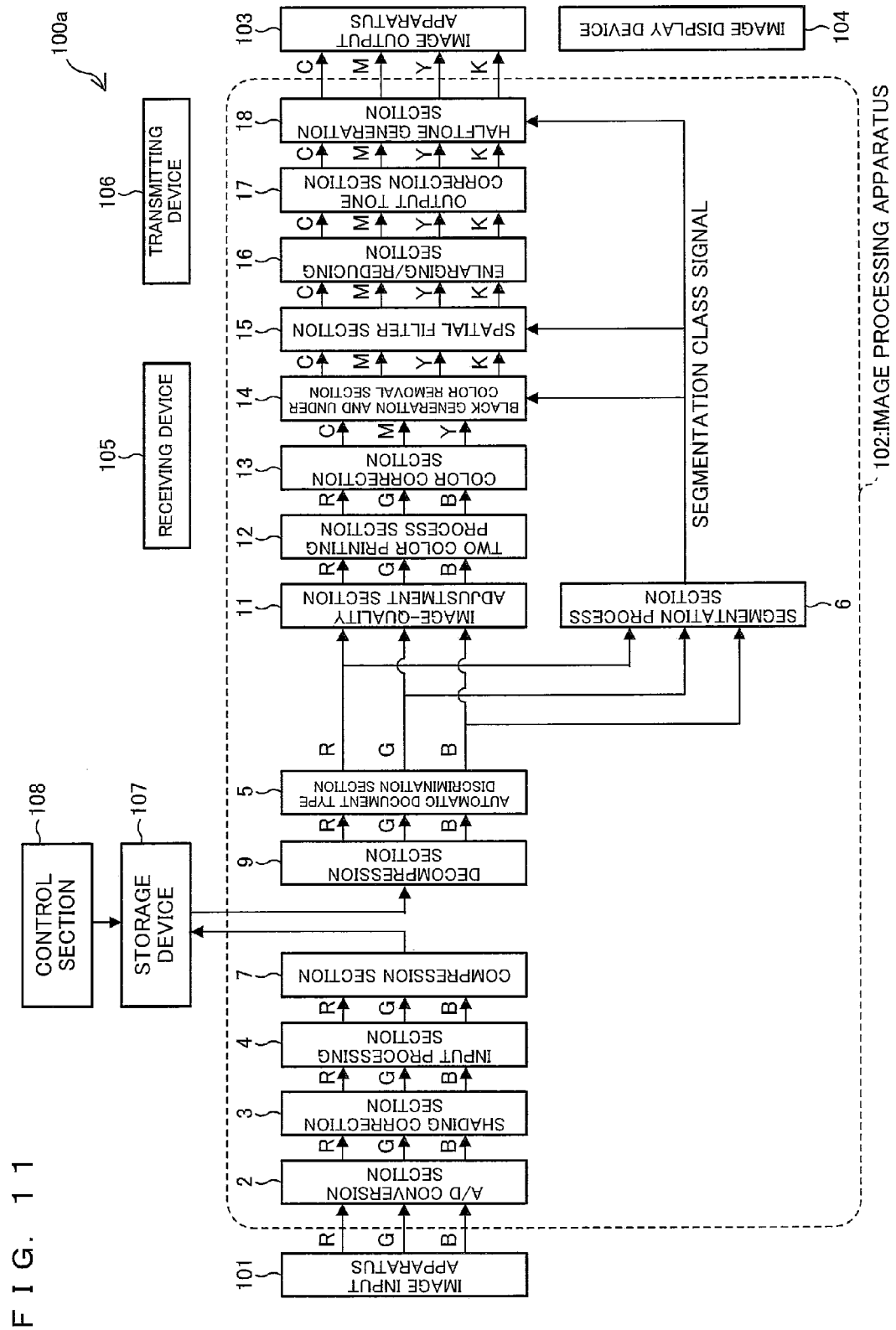
FIG. 11

In the image forming apparatus 100 of FIG. 1, the compressed image data (encoded codes) and the segmentation class signal codes are stored in the storage device 107 in association with one another. However, as in an image forming apparatus 100a of FIG. 11, there may be such an arrangement that: after the image input apparatus 101 reads image data, the image data are encoded and stored temporarily in the storage device 107 before a segmentation process and an automatic document type discrimination process; and the image data are read out from the storage device 107, decompressed, and then subjected to a segmentation process and an automatic document type discrimination process.

Further, the image forming apparatus 100 of FIG. 1 may be capable of executing an image filing mode (image filing job) during a job such as the copier mode, the printer mode, the facsimile transmission mode, the facsimile reception mode, or the image transmission mode. The image filing mode is a mode in which to create an image file (e.g., JPEG or TIFF file), during a job such as the copier mode, in accordance with image data obtained by the image input apparatus 101 or image data received from outside and store the image file in the storage device 107.

At the time of filing in the image filing mode, the image data obtained by the image input apparatus 101 or the image data received from outside are converted into an image file (e.g., JPEG or TIFF file) by the image processing apparatus 102. The image filed is sent to a filing processing section (job apparatus; not shown). The filing processing section stores the image file in the storage device 107.

Further, in the case of a preview during each job (e.g., the copier mode, the print mode, or the facsimile transmission mode), the image data obtained by the image input apparatus 101 or the image data received from outside are processed by the image processing apparatus 102, and then sent to the image display device 104, regardless of the execution of the image filing mode. Furthermore, in the case of a preview during each job, the image processing apparatus 102 executes the same image processing regardless of the execution of the image filing mode. For example, at the time of a preview display in the copier mode, the image processing apparatus 102 performs such processes as shown in FIG. 3, regardless of the execution of the image filing mode. Further, at the time of a preview display in the facsimile transmission mode, the image processing apparatus 102 performs such processes as shown in FIG. 8, regardless of the execution of the image filing mode.

(6) Advantages of the Image Processing Apparatus of the Present Embodiment

The image processing apparatus 102 of the present embodiment supplies image data to the image output apparatus (job apparatus, printing apparatus) 103, which performs a print job (copier mode, print mode), and supplies the image data to the image display device 104 so that the image display device 104 displays a preview before the execution of the print job.

Moreover, the image processing apparatus 102 includes a first image processing section which performs first image processing on image data to be supplied to the image output apparatus 103, which performs second image processing on image data to be supplied to the image display device 104, the second image processing being different from the first image processing, and which performs the first image processing and the second image processing with use of a common circuit area. An example of the first image processing section is the color correction section 13 in the copier mode and the full-color mode. This is because the color correction section 13 uses a common circuit area for a process of conversion from RGB into CMY (first image processing) and a process of conversion from RGB into R'G'B' (second image processing).

This brings about a merit of reducing the circuit size of an image processing circuit even in an image processing apparatus that performs image processing for a printing process or the like and image processing for a preview before the printing process.

Further, in the present embodiment, at the time of printing in the copier mode and the full-color mode, the color correction section 13 performs a process by which additive image data (RGB) read by the scanner and conforming to the characteristics of the scanner are converted into subtractive image data (CMY) conforming to the characteristics of the image output apparatus 103. Meanwhile, at the time of a preview in the copier mode and the full-color mode, the color correction section 13 performs a process by which the additive image data (RGB) read by the scanner and conforming to the characteristics of the scanner are converted into additive image data (R'G'B') conforming to the characteristics of the image display device 104. That is, at the time of a preview display, the additive image data conforming to the characteristics of the scanner are converted directly into the image data conforming to the characteristics of the image display device 104. Therefore, at the time of a preview display in the copier mode and the full-color mode, the image processing apparatus 102 of the present embodiment performs a single nonlinear conversion from the RGB image data into the R'G'B' image data, but does not perform a plurality of nonlinear conversions as in the arrangement of Japanese Patent Application Publication, Tokukaihei, 9-135316 A (1997), thus making it possible to suppress accumulation of errors in conversion and suppress deterioration in color reproducibility. In Japanese Patent Application Publication, Tokukaihei, 9-135316 A (1997), a total of four conversions are performed, namely the conversion from RGB data into CMY data, the conversion from CMY data into CMYK data, the conversion from CMYK data into CMY data, and the conversion from the CMY data into RGB data, which result in accumulation of errors in conversion and deterioration in color reproducibility.

Further, at the time of a preview in the copier mode and the single-color mode or at the time of a preview in the copier mode and the two-color mode, the present embodiment performs such a nonlinear conversion, but the number of such nonlinear conversions is only two. Therefore, it is possible to better suppress deterioration in color reproducibility than in the arrangement of Japanese Patent Application Publication, Tokukaihei, 9-135316 A (1997), in which a total of four nonlinear conversions are performed.

Furthermore, in the present embodiment, at the time of printing in the copier mode and the full-color mode, the black generation and under color removal section 14 converts CMY image into CMYK image data; meanwhile, at the time of a preview display in the copier mode and the full-color mode, the black generation and under color removal section 14 performs no processing on R'G'B' and outputs R'G'B' directly. This makes it possible to simplify the circuit arrangement by using a common image data path in the image processing circuit for printing image data that needs to be converted from CMY into CMYK and preview image data that does not need to be subjected to a black generation and under color removal process.

The image processing apparatus 102 of the present embodiment can perform image processing based on a result of judgment by the automatic document type discrimination section 5, image processing based on a result of processing by the segmentation process section 6, and a background removal process. The effects of these processes are reflected in a preview image that is displayed by the image display device 104.

[Embodiment 2]

In the facsimile reception mode, binary image data is received. However, if binary image data with low resolution is reduced without any treatment in order to carry out preview display, problems (e.g. a line vanishes or a text gets illegible) occurs, which makes a preview image illegible.

For that reason, in the image processing apparatus of the present embodiment, the following process is made in order to display an illegible preview image of binary image data. It should be noted that an image forming apparatus 100' of the present Embodiment in FIG. 12 has basically the same structure as that of Embodiment 1, and carries out basically the same process as that of Embodiment 1. Therefore, members having the same functions as those of the image forming apparatus 100 of Embodiment 1 are given the same reference numerals and explanations thereof are omitted here except where such members carry out a process specific to the present Embodiment.

Figure 12:
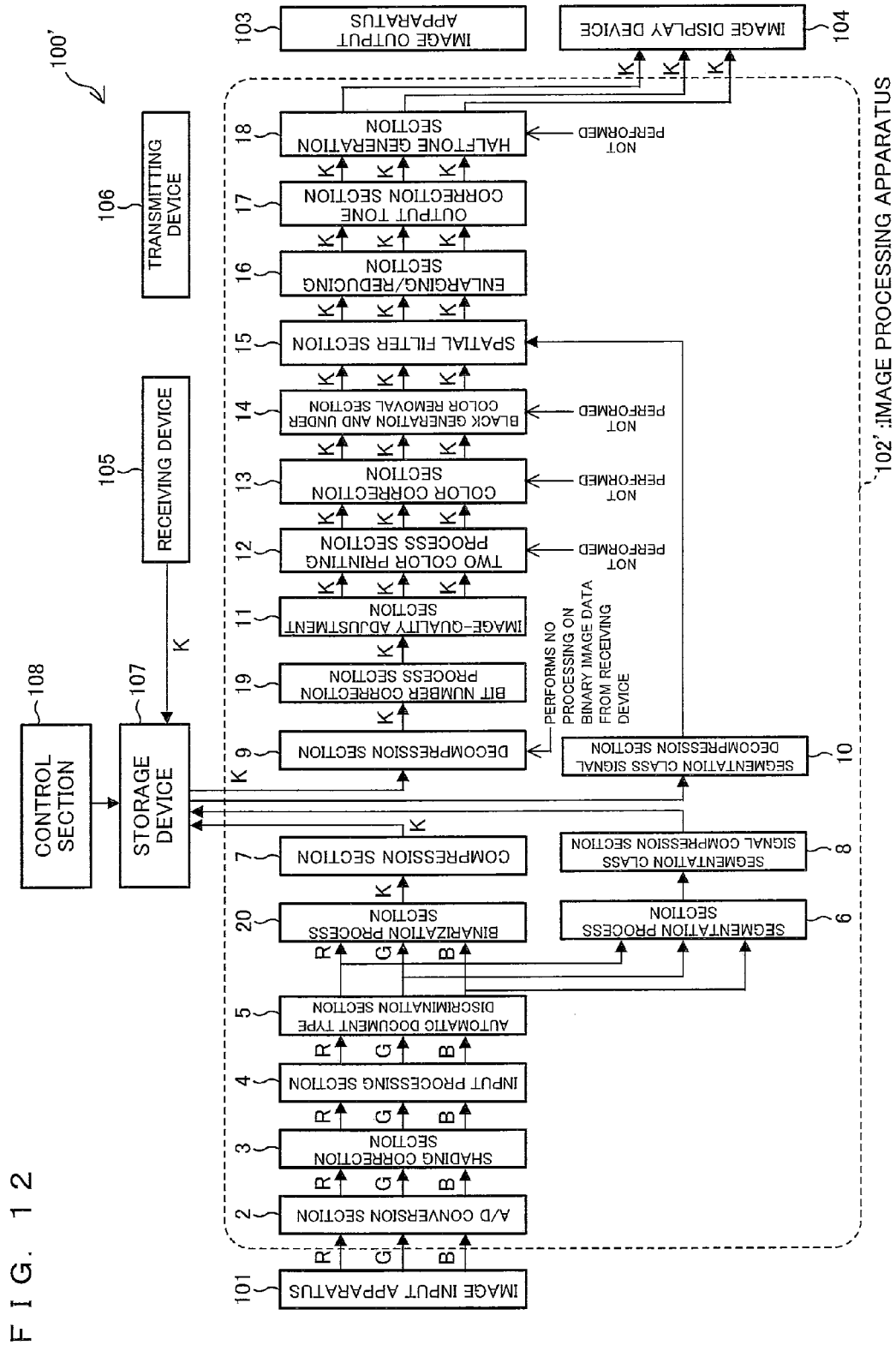
FIG. 12

As shown in FIG. 12, in an image processing apparatus (image processing section) 102' included in the image forming apparatus 100', a bit number correction process section (tone conversion process section) 19 converts tones of binary image data into tones of multilevel image data, a spatial filter section 15 carries out a smoothing process on the image data, and an enlarging/reducing section 16 carries out an interpolation process so as to downsample the image data, so that a preview display is carried out. The following details processes of the bit number correction process section 19, the spatial filter section 15, and the enlarging/reducing section 16.

[Bit Number Correction Process Section]

The bit number correction process section 19 converts tones of binary image data into the maximum tone and the minimum tone of multilevel image data. In this case, the smaller tone of the binary image data is converted into the minimum tone of the multilevel image data processed by the image processing apparatus 102, and the larger tone of the binary image data is converted into the maximum tone of the multilevel image data processed by the image processing apparatus 102. If the multilevel image data is 8-bit data in the image processing apparatus 102, the maximum tone is 255 and the minimum tone is 0. Therefore, the tones of the image data are converted from (0, 1) into (0, 255).

Here, the binary image data is data received by a receiving device in a facsimile reception mode for example. Alternatively, the binary image data may be data obtained by causing a binarization process section 20 provided between the document type automatic discrimination section 5 and a compression section 7 to binarize image data scanned by the image input apparatus 101 and causing the compression section 7 to compress the binarized image data. The binarization process section 20 selects a G signal from RGB image data, converts the G signal into a K signal, and compares the K signal with a threshold value (e.g. 128 in case of 8-bit image data). Alternatively, instead of selecting the G signal, the RGB image data may be converted into a luminance signal and binarized with use of the Equation 2 as explained above. The binary image data resulting from the binarization is stored in a storage device 107 and used for facsimile transmission and image transmission for example. In this case, since the data has been compressed, the decompression section 9 decompresses the compressed data.

[Spatial Filter Section]

Figure 13:
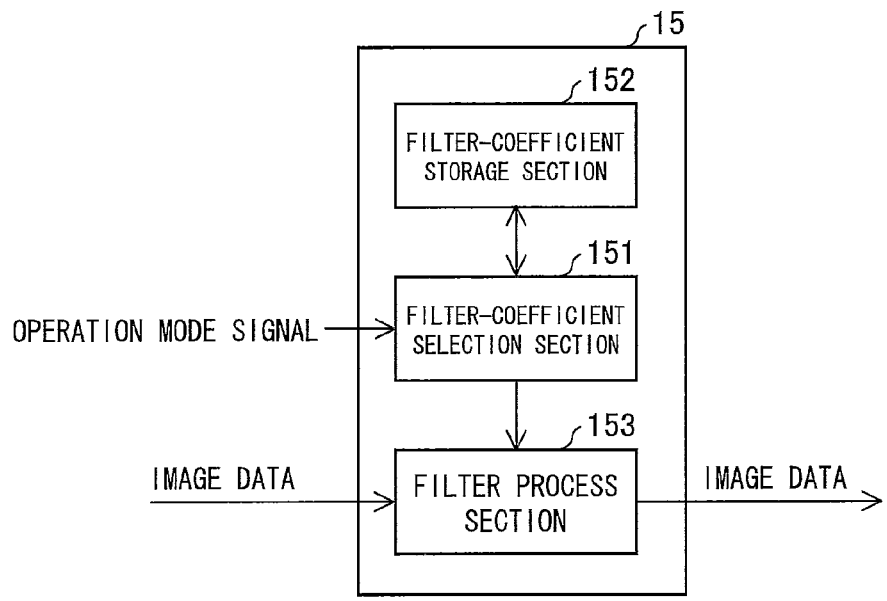
FIG. 13

As shown in FIG. 13, the spatial filter section (smoothing process section) 15 includes a filter-coefficient selection section 151, a filter-coefficient storage section 152, and a filter process section 153. The filter-coefficient selection section 151 selects filter coefficients in accordance with an operation mode signal indicative of a process such as a printing process, a transmission process, and a preview display process in a copier mode, a facsimile transmission mode, a facsimile reception mode, and an image transmission mode.

The filter-coefficient storage section 152 is a block in which to store filter coefficients corresponding to operation mode signals. The filter process section 153 is a block that executes a filter process on image data with use of filter coefficients selected by the filter-coefficient selection section 151.

At the time of a printing process in the copier mode, at the time of a transmission process in the facsimile transmission mode, or at the time of a transmission process in the image transmission mode, the spatial filter section 15 receives the segmentation class signals, and the filter-coefficient selection section 151 therefore selects filter coefficients in accordance with the received operation mode signal (indicative of the printing process in the copier mode, the transmission process in the facsimile transmission mode, or the transmission process in the image transmission mode) and the segmentation class signals.

Further, at the time of a preview display in each mode, the filter-coefficient selection section 151 selects filter coefficients for a blur process on the input image data (image processing data) (i.e., the R' G' B' image data in the copier mode or image transmission mode, the K image data in the facsimile transmission mode or facsimile reception mode). The filter coefficients for the blur process are filter coefficients for a smoothing process. An example is a matrix of filter coefficients that become larger than one another toward the center of the matrix and become smaller than one another toward the periphery of the matrix. A specific example is as follows:

$$\begin{pmatrix} 0 & 1 & 2 & 1 & 0 \\ 1 & 3 & 5 & 3 & 1 \\ 2 & 5 & 10 & 5 & 2 \\ 1 & 3 & 5 & 3 & 1 \\ 0 & 1 & 2 & 1 & 0 \end{pmatrix}$$

The coefficients for a smoothing process are not limited to those shown above, and it is preferable to use such coefficients that uniform blurring can be achieved. Further, it is possible to use filter coefficients all of which take on a value of 1. It should be noted that it is better not to use a filter having both enhancement and smoothness characteristics.

Figure 14:
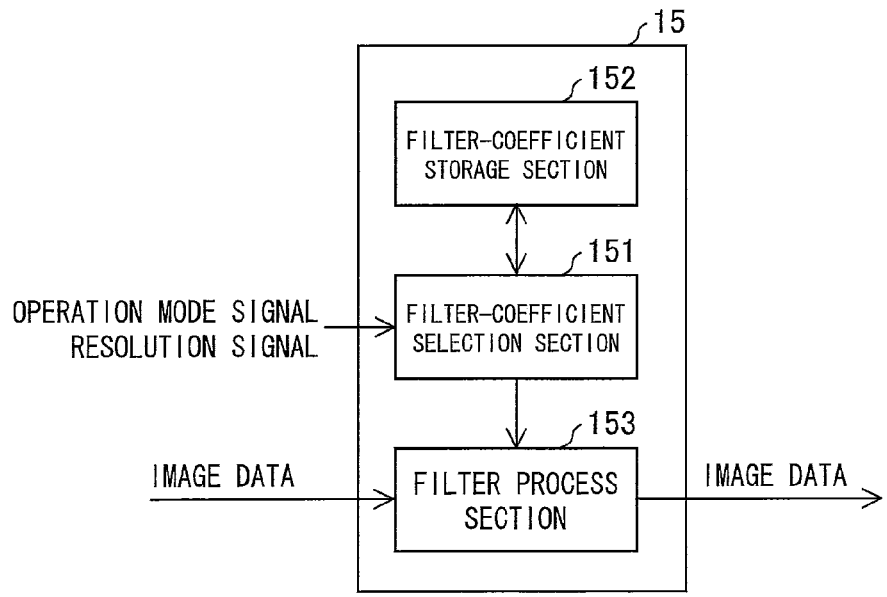
FIG. 14

Further, as shown in FIG. 14, the filter coefficient selection section 151 may select a filter coefficient according to resolution of image data referred to by the spatial filter section 15 (inputted to the spatial filter section 15) when displaying a preview image in a facsimile reception mode. Herein, the resolution of image data referred to by the spatial filter section 15 is resolution of binary image data received by the facsimile. Resolution is determined according to notification of performance that is exchanged based on a protocol on a facsimile transmission. Specifically, the receiver (reception device 105) causes image resolution indicated in a DCS (Digital Command Signal) transmitted from an originating communication device to be stored in a storage device 107 (alternatively, non-volatile memory) and manages the image resolution in such a manner that the image resolution is related to the received binary image data. Thus, management information such as resolution and the number of lines, which accompanies binary image data, is stored separately from a binary image in such a manner that the information is related to binary image data, and referred to when necessary, such as a time of a printing process and a time of preview display.

Specifically, the filter coefficient selection section 151 selects a filter coefficient that causes a smaller blur as resolution of image data referred to by the spatial filter section 15 is higher. Examples of resolution include: a resolution of 200×100 dpi for normal text; a resolution of 200×200 dpi for small text; a fine resolution of 200×400 dpi; and a highly fine resolution of 400×400 dpi. Examples of filter coefficients corresponding to these resolutions are as follows. First, a specific example of filter coefficients corresponding to the resolution for normal text is as follows:

$$\begin{pmatrix} 3 & 7 & 10 & 7 & 3 \\ 7 & 10 & 15 & 10 & 7 \\ 10 & 15 & 20 & 15 & 10 \\ 7 & 10 & 15 & 10 & 7 \\ 3 & 7 & 10 & 7 & 3 \end{pmatrix}$$

Further, a specific example of filter coefficients corresponding to the resolution for small text is as follows:

$$\begin{pmatrix} 0 & 1 & 3 & 1 & 0 \\ 1 & 5 & 7 & 5 & 1 \\ 3 & 7 & 15 & 7 & 3 \\ 1 & 5 & 7 & 5 & 1 \\ 0 & 1 & 3 & 1 & 0 \end{pmatrix}$$

Furthermore, a specific example of filter coefficients for the fine resolution is as follows:

$$\begin{pmatrix} 0 & 0 & 1 & 0 & 0 \\ 0 & 3 & 5 & 3 & 0 \\ 1 & 5 & 10 & 5 & 1 \\ 0 & 3 & 5 & 3 & 0 \\ 0 & 0 & 1 & 0 & 0 \end{pmatrix}$$

Further, a specific example of filter coefficients for the highly fine resolution is as follows:

$$\begin{pmatrix} 0 & 0 & 0 & 0 & 0 \\ 0 & 1 & 2 & 1 & 0 \\ 0 & 2 & 4 & 2 & 0 \\ 0 & 1 & 2 & 1 & 0 \\ 0 & 0 & 0 & 0 & 0 \end{pmatrix}$$

In cases where the image input apparatus 101 differs in resolution between a main scanning direction and a sub-scanning direction (e.g., 100×200 dpi and 200×100 dpi), it is possible to set and select different filter coefficients.

[Enlarging/Reducing Section]

At the time of displaying a preview image of binary image data on the image display device 104, the enlarging/reducing section (interpolation process section) 16 performs a downsampling process (interpolation process) on image data by interpolation in accordance with the resolution and screen size of the image display device 104. The downsampling process achieves a reduction in data size, thus making it possible to shorten the amount of time it takes to display image data to be displayed.

Figure 15:
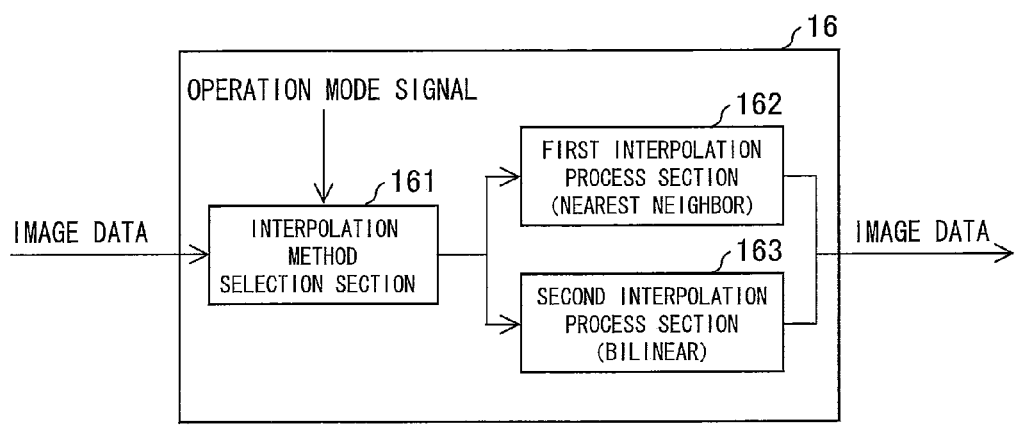
FIG. 15

As shown in FIG. 15, the enlarging/reducing section 16 includes an interpolation method selection section 161, a first interpolation process section 162, and a second interpolation process section 163.

The interpolation method selection section 161 selects an interpolation method for the image data (image processing data) (i.e., the R'G'B' image data in the copier mode or image transmission mode, the K image data in the facsimile transmission mode or facsimile reception mode) in accordance with the operation mode signal.

The first interpolation process section 162 performs an interpolation process on the image data with use of a nearest neighbor method, and the second interpolation process section 163 performs an interpolation process on the image data with use of a bilinear method. The term "nearest neighbor method" here means a method by which the value of an existing pixel closest to the pixel to be interpolated or in a predetermined position relationship with the pixel to be interpolated is taken as the value of the pixel to be interpolated. Further, the term "bilinear method" here means a method by which the average of values weighed in proportion to the distance of four existing pixels around the pixel to be interpolated is taken as the value of the pixel to be interpolated. The second interpolation process section 163 may use a bicubic method (i.e., a method by which interpolation calculation is performed with use of a total of sixteen pixels, i.e., twelve pixels around the pixel to be interpolated, in addition to the four pixels around the pixel to be interpolated), instead of using the bilinear method. Use of the bilinear or bicubic method as a method for interpolating the image data results in blurring of the image data, whereby the image data (image processing data) are subjected to a blur process.

When the operation mode signal is a signal indicative of a transmission process in the facsimile transmission mode, the interpolation method selection section 161 selects the nearest neighbor method as a method for interpolating the image data, and then sends the image data to the first interpolation process section 162. When the operation mode signal is a signal indicative of a preview display process in the facsimile transmission mode or a signal indicative of a mode other than the facsimile transmission mode (including a signal indicative of a preview display process in the facsimile reception mode), the interpolation method selection section 161 selects the bilinear or bicubic method as a method for interpolating the image data, and then sends the image data to the second interpolation process section. It should be noted that the bilinear method results in a more blurred image than the nearest neighbor method does and the bicubic method results in a slightly more edge-enhanced image than the bilinear method does.

As described above, when image data obtained by converting tones of binary image data into tones of multilevel image data is subjected to a smoothing process and is averaged, the image is blurred and an intermediate value is generated. When the image data with an intermediate value is subjected to the interpolation process by a bilinear method and reduced, deletion of information is prevented. This prevents deterioration in image quality, and consequently lines and texts are maintained, making the image legible.

The process of blurring image data whose preview is to be displayed can be performed by the spatial filter section 15 or the enlarging/reducing section 16. In the case of a blur process through a filter process in the spatial filter section 15 at the time of a preview display, the enlarging/reducing section 16 may perform an interpolation process with use of the nearest neighbor method. Further, in cases where the enlarging/reducing section 16 performs an interpolation process with use of the bilinear or bicubic method, the spatial filter section 15 does not need to perform a blur process. However, it is preferable that the spatial filter process 15 perform a blur process with filter coefficients and the enlarging/reducing section 16 perform an interpolation process with use of the bilinear or bicubic method. That is, although it is possible to perform a blur process only in either the spatial filter section 15 or the enlarging/reducing section 16, it is preferable to perform blur processes both in the spatial filter section 15 and the enlarging/reducing section 16.

The blur process thus performed on image data whose preview is to be displayed makes it possible to inhibit deterioration in image quality even if the preview is displayed by an image display device whose resolution is lower than the resolution at which the input image data have been read. This makes it possible to display a high-quality preview of a text and/or line art image as well as a picture (photograph) image and thereby enhance the legibility of texts and/or the like. If the image display device 104 has a large screen, it is possible to reduce the degree of blurring. Therefore, it is preferable to determine the level of blurring in consideration of them.

In the image forming apparatus 100, a preview display of facsimile reception data is carried out as follows. A check box for confirming an image of received data is displayed on a screen of the image display apparatus 104. Making the check box "ON" allows confirmation of an image. When there is facsimile reception data, a dialog for urging a user to select whether to confirm the image or not is displayed on the screen. When the user selects confirmation of the image, a list of received data is displayed on the screen. The list may be displayed as a thumbnail. When the user selects received data which the user wishes to have displayed from the list and press an "image confirmation" button for displaying the image, a preview image is displayed.

In a case of image data obtained by converting tones of binary image data by the bit number correction process section 19, tone-correcting the image data by the output tone correction section 17 in a subsequent stage with gamma-correction curve for more legible texts allows a preview display with high visibility. Further, the process by the output tone correction section 17 may be applied to a printing process in the facsimile reception mode, which allows a printed image with high visibility.

The present embodiment can be achieved by storing, in a computer-readable storage medium containing program code (executable program, intermediate code program, or source program) to be executed by a computer, an image processing method for performing a preview while converting tones of binary image data into tones of multilevel image data and smoothing them. This makes it possible to provide a portable storage medium containing a program for the image processing method.

In the present embodiment, the storage medium may be a memory (not shown) for processing in a microcomputer. For example, the storage medium may be a program medium such as a ROM per se. Alternatively, the storage medium may be a program medium that can read by inserting the storage medium into a program reading device provided as an external storage device (not shown).

In either case, the contained program code may be arranged to be accessible to a microprocessor that will execute the program code. Alternatively, the program code may be arranged to be read and then downloaded to a program storage area (not shown) of the microcomputer. It is assumed that the download program is stored in advance in the main apparatus.

It should be noted here that the program medium is a storage medium arranged to be separable from the main body. The storage medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another storage medium. The present invention can be realized in the form of a computer data signal, embedded in a carrier wave, in which the program code is embodied electronically. The storage medium is read by a digital color image forming apparatus of a program reading device provided in a computer system, whereby the aforementioned image processing method is executed.

As described above, an image processing apparatus of the present invention is an image processing apparatus, including an image processing section for processing multilevel image data, for generating image data that allows a preview image of binary image data to be displayed by an image displaying device for displaying an image of multilevel image data, the image processing apparatus comprising: a tone conversion process section for converting tones of binary image data into a maximum tone and a minimum tone of multilevel image data processed by the image processing section; a smoothing process section for performing a smoothing process on image data resulting from the conversion by the tone conversion process section; and an interpolation process section for performing an interpolation process on the image data subjected to the smoothing process by the smoothing process section, so that smoothness of tones of the image data is maintained, the image data subjected to the interpolation process by the interpolation process section being supplied to the image display device.

With the arrangement, when the image display device for displaying multilevel image data displays a preview image of binary image data, tones of the binary image data are converted into tones of multilevel image data and the multilevel image data is subjected to the smoothing process, generating an intermediate value. By downsampling image data with the intermediate value by the interpolation process and displaying a preview image of the image data, deletion of information is prevented. This prevents deterioration in image quality. Consequently, lines and texts are maintained, making the image more legible. Accordingly, with the arrangement, it is possible to reduce deletion of image information when the image display device for displaying multilevel image data displays a preview image of binary image data, thereby preventing deterioration in image quality. This provides a preview display with high visibility.

In addition to the above arrangement, the image processing apparatus of the present invention may be arranged so that the smoothing process section performs a filter process as the smoothing process and includes a filter coefficient selection section for selecting a filter coefficient in accordance with resolution of the binary image data.

With the arrangement, different filter coefficients can be selected according to resolution of the binary image data. This allows securing the most appropriate image quality with respect to each resolution.

In addition to the above arrangement, the image processing apparatus of the present invention may be arranged so that the interpolation process section performs the interpolation process by a bilinear method or a bicubic method.

With the arrangement, the enlarging/reducing section performs the interpolation process by the bilinear method or the bicubic method. This prevents thinning or discontinuity of lines and texts in a preview display.

In addition to the above arrangement, the image processing apparatus of the present invention may be arranged so that the binary image data is data received by facsimile.

Data received by facsimile is binary and at low resolution. Further, such data is downsampled in order to carry out a preview display. In this case, blurring the data by the smoothing process allows preventing deterioration in image quality of a preview image. As described above, the present invention is more effective for data received by facsimile.

As described above, an image forming apparatus of the present invention is an image forming apparatus, comprising any one of the image processing apparatuses as above and an image display device for displaying an image of multilevel image data.

In the image forming apparatus of the present invention, when the image display device for displaying multilevel image data displays a preview image of binary image data, tones of the binary image data are converted into tones of multilevel image data and the multilevel image data is subjected to the smoothing process, thereby generating an intermediate value. By downsampling image data with the intermediate value by the interpolation process and displaying a preview image of the image data, deletion of information is prevented. This prevents deterioration in image quality. This provides an image forming apparatus that allows an image displaying device for displaying multilevel image data to display a preview image of binary image data without deteriorating image quality of image data.

As described above, an image processing method of the present invention is an image processing method, by which an image processing apparatus including an image processing section for processing multilevel image data generates image data that allows a preview image of binary image data to be displayed by an image displaying device for displaying an image of multilevel image data, the image processing method comprising the steps of: (i) converting tones of binary image data into a maximum tone and a minimum tone of multilevel image data processed by the image processing section; (ii) performing a smoothing process on image data resulting from the conversion in the step (i); and (iii) performing an interpolation process on the image data subjected to the smoothing process in the step (ii) so that smoothness of tones of the image data is maintained; and (iv) supplying the image data subjected to the interpolation process in the step (iii) to the image display device.

The above method yields the similar effect as the image processing apparatus does. That is, the above method allows an image display device for displaying multilevel image data to display a preview image of binary image data without deteriorating image quality of image data.

Further, the image processing apparatus of the present invention may be realized by a computer. In this case, the present invention encompasses: an image processing program for causing a computer to function as sections of the image processing apparatus to realize the image processing apparatus by the computer; and a computer-readable storage medium in which the image processing program is stored.

With the arrangement, by causing a computer to read the image processing program and execute the program, it is possible to yield the same effect as the effect yielded by the image processing apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, numerical range beyond the range disclosed in the present invention may be encompassed in the present invention provided that the numerical range is a reasonable range that is not against the sprit of the present invention.

Industrial Applicability

The image processing apparatus of the present invention is applicable to a device that deals with image data. In particular, the image processing apparatus is particularly applicable to a multifunction printer, a copier, a printer, a facsimile device.

The invention claimed is:

1. An image processing apparatus, including an image processing section for processing multilevel image data, for generating image data that allows a preview image of binary image data to be displayed by an image displaying device for displaying an image of multilevel image data, the image processing apparatus comprising:
   a tone conversion process section for converting tones of binary image data into a maximum tone and a minimum tone of multilevel image data processed by the image processing section;
   a smoothing process section for performing a smoothing process on image data resulting from the conversion by the tone conversion process section; and
   an interpolation process section for performing an interpolation process on the image data subjected to the smoothing process by the smoothing process section, so that smoothness of tones of the image data is maintained,
   the image data subjected to the interpolation process by the interpolation process section being supplied to the image display device, and
   the smoothing process section performing a filter process as the smoothing process and including a filter coefficient selection section for selecting a filter coefficient in accordance with resolution of the binary image data.

2. A non-transitory computer-readable storage medium, in which an image processing program for causing an image processing apparatus as set forth in claim 1 to function is stored, the image processing program causing a computer to function as sections of the image processing apparatus.

3. The image processing apparatus as set forth in claim 1, wherein the smoothing process section performs a filter process as the smoothing process and includes a filter coefficient selection for selecting filter coefficients in such a manner that coefficients closer to a middle of a matrix are larger and coefficients closer to peripherals of the matrix are smaller.

4. An image forming apparatus, comprising an image processing apparatus as set forth in claim 1 and an image display device for displaying an image of multilevel image data.

5. The image processing apparatus as set forth in claim 1, wherein the binary image data is data received by facsimile.

6. An image processing apparatus, including an image processing section for processing multilevel image data, for generating image data that allows a preview image of binary image data to be displayed by an image displaying device for displaying an image of multilevel image data, the image processing apparatus comprising:
- a tone conversion process section for converting tones of binary image data into a maximum tone and a minimum tone of multilevel image data processed by the image processing section;
- a smoothing process section for performing a smoothing process on image data resulting from the conversion by the tone conversion process section; and
- an interpolation process section for performing an interpolation process on the image data subjected to the smoothing process by the smoothing process section, so that smoothness of tones of the image data is maintained, the image data subjected to the interpolation process by the interpolation process section being supplied to the image display device, and the interpolation process section performs the interpolation process by a bilinear method or a bicubic method.

7. An image forming apparatus, comprising an image processing apparatus as set forth in claim 6 and an image display device for displaying an image of multilevel image data.

8. A non-transitory computer-readable storage medium, in which an image processing program for causing an image processing apparatus as set forth in claim 6 to function is stored, the image processing program causing a computer to function as sections of the image processing apparatus.

9. The image processing apparatus as set forth in claim 6, wherein the smoothing process section performs a filter process as the smoothing process and includes a filter coefficient selection for selecting filter coefficients in such a manner that coefficients closer to a middle of a matrix are larger and coefficients closer to peripherals of the matrix are smaller.

10. The image processing apparatus as set forth in claim 6, wherein the binary image data is data received by facsimile.

* * * * *